United States Patent
Bowley et al.

(10) Patent No.: US 7,298,442 B2
(45) Date of Patent: Nov. 20, 2007

(54) CHOLESTERIC LIQUID CRYSTAL OPTICAL BODIES AND METHODS OF MANUFACTURE AND USE

(75) Inventors: Christopher C. Bowley, Somerville, MA (US); Ikuko Ebihara, St. Paul, MN (US); Gregory Edward Gilligan, Hastings, MN (US); Richard John Pokorny, Oakdale, MN (US); Marc Dudley Radcliffe, Newport, MN (US); Prabhakara Satyauolu Rao, Oakdale, MN (US); Philip Edwin Watson, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/066,340

(22) Filed: Feb. 24, 2005

(65) Prior Publication Data
US 2005/0140918 A1 Jun. 30, 2005

Related U.S. Application Data

(63) Continuation of application No. 09/957,724, filed on Sep. 21, 2001, now Pat. No. 6,876,427.

(51) Int. Cl.
*G02F 1/1335* (2006.01)
(52) U.S. Cl. .................. 349/115; 349/175; 349/185
(58) Field of Classification Search ............. 349/115, 349/175, 185
See application file for complete search history.

(56) References Cited

U.S. PATENT DOCUMENTS

| | | | |
|---|---|---|---|
| 540,768 A | 6/1895 | Western | |
| 3,124,639 A | 3/1964 | Kahn | |
| 3,508,947 A | 4/1970 | Hughes | |
| 3,610,729 A | 10/1971 | Rogers | |
| 3,669,525 A | 6/1972 | Adams | |
| 3,711,176 A | 1/1973 | Alfrey, Jr. | |

(Continued)

FOREIGN PATENT DOCUMENTS

DE     197 45 647     4/1999

(Continued)

OTHER PUBLICATIONS

Schrenk et al., Nanolayer Polymeric Optical Films, Tappi Journal, pp. 169-174, Jun. 1992.

(Continued)

*Primary Examiner*—Mike Qi
*Assistant Examiner*—David Y Chung

(57) ABSTRACT

An optical body includes a) first particles comprising a first cholesteric liquid crystal material and b) a second cholesteric liquid crystal material. The first particles and the second cholesteric liquid crystal material form a structure where the first cholesteric liquid crystal material has a pitch that is different than the second cholesteric liquid crystal material. In one example, the second cholesteric liquid crystal material is in the form of second particles. In another example, the first particles are dispersed in a matrix of the second cholesteric liquid crystal material. In other examples, the optical body has more than one layer. In addition, one or more additional cholesteric liquid crystal materials can be used in the optical body. These optical bodies can be used as a reflective polarizer and can be used in a display.

11 Claims, 15 Drawing Sheets

U.S. PATENT DOCUMENTS

| | | |
|---|---|---|
| 3,860,036 A | 1/1975 | Newman, Jr. |
| 3,996,885 A | 12/1976 | Jackson |
| 4,001,024 A | 1/1977 | Dittman |
| 4,293,435 A | 10/1981 | Portugall |
| 4,446,305 A | 5/1984 | Rogers |
| 4,520,189 A | 5/1985 | Rogers |
| 4,521,588 A | 6/1985 | Rogers |
| 4,525,413 A | 6/1985 | Rogers |
| 4,688,901 A | 8/1987 | Albert |
| 4,720,426 A | 1/1988 | Englert |
| 4,974,941 A | 12/1990 | Gibbons |
| 5,032,009 A | 7/1991 | Gibbons |
| 5,061,046 A | 10/1991 | Lee |
| 5,188,760 A | 2/1993 | Hikmet |
| 5,211,878 A | 5/1993 | Reiffenrath |
| 5,235,443 A | 8/1993 | Barnik |
| 5,269,995 A | 12/1993 | Ramanathan |
| 5,294,657 A | 3/1994 | Melendy |
| 5,316,703 A | 5/1994 | Schrenk |
| 5,319,478 A | 6/1994 | Funfschilling |
| 5,332,522 A | 7/1994 | Chen |
| 5,364,557 A | 11/1994 | Faris |
| 5,389,324 A | 2/1995 | Lewis |
| 5,389,698 A | 2/1995 | Chigrinov |
| 5,448,404 A | 9/1995 | Schrenk |
| 5,486,935 A | 1/1996 | Kalmanash |
| 5,486,949 A | 1/1996 | Schrenk |
| 5,602,661 A | 2/1997 | Schadt |
| 5,612,820 A | 3/1997 | Schrenk |
| 5,629,055 A | 5/1997 | Revol |
| 5,686,979 A | 11/1997 | Weber |
| 5,699,188 A | 12/1997 | Gilbert |
| 5,721,603 A | 2/1998 | DeVaan |
| 5,741,549 A | 4/1998 | Maier |
| 5,744,057 A | 4/1998 | Meyer |
| 5,744,534 A | 4/1998 | Ishiharada |
| 5,751,388 A | 5/1998 | Larson |
| 5,767,935 A | 6/1998 | Ueda |
| 5,770,306 A | 6/1998 | Suzuki |
| 5,780,629 A | 7/1998 | Etzbach |
| 5,783,120 A | 7/1998 | Ouderkirk |
| 5,793,456 A | 8/1998 | Broer |
| 5,808,794 A | 9/1998 | Weber |
| 5,825,542 A | 10/1998 | Cobb, Jr. |
| 5,825,543 A | 10/1998 | Ouderkirk |
| 5,838,407 A | 11/1998 | Chigrinov |
| 5,847,068 A | 12/1998 | Maxein |
| 5,867,316 A | 2/1999 | Carlson |
| 5,882,774 A | 3/1999 | Jonza |
| 5,886,242 A | 3/1999 | Etzbach |
| 5,940,149 A | 8/1999 | Vanderwerf |
| 5,958,293 A | 9/1999 | Gibbons |
| 5,962,114 A | 10/1999 | Jonza |
| 5,965,247 A | 10/1999 | Jonza |
| 6,001,277 A | 12/1999 | Ichimura |
| 6,088,079 A | 7/2000 | Kameyama |
| 6,096,375 A | 8/2000 | Ouderkirk |
| 6,111,697 A | 8/2000 | Merrill |
| 6,113,679 A | 9/2000 | Adkins |
| 6,359,673 B1 | 3/2002 | Stephenson |
| 6,377,325 B2 | 4/2002 | Faris |
| 6,573,963 B2 * | 6/2003 | Ouderkirk et al. .......... 349/117 |
| 6,643,001 B1 | 11/2003 | Faris |
| 6,917,399 B2 * | 7/2005 | Pokorny et al. .............. 349/96 |
| 2001/0030720 A1 | 10/2001 | Ichihasi |

FOREIGN PATENT DOCUMENTS

| | | |
|---|---|---|
| EP | 0 834 754 | 4/1998 |
| EP | 0 867 749 | 9/1998 |
| JP | 8-271731 | 10/1996 |
| JP | 9-133810 | 5/1997 |
| JP | 9-189811 | 7/1997 |
| JP | 9-304770 | 11/1997 |
| JP | 10-54905 | 2/1998 |
| JP | 10-54909 | 2/1998 |
| JP | 10-142407 | 5/1998 |
| JP | 10-158268 | 6/1998 |
| JP | 10-197722 | 7/1998 |
| JP | 10-319233 | 12/1998 |
| JP | 10-319235 | 12/1998 |
| JP | 10-321025 | 12/1998 |
| JP | 10-321026 | 12/1998 |
| JP | 10-339812 | 12/1998 |
| JP | 10-339867 | 12/1998 |
| JP | 11-44816 | 2/1999 |
| JP | 11-521133 | 2/1999 |
| JP | 11-64840 | 3/1999 |
| JP | 11-84841 | 3/1999 |
| JP | 11-109353 | 4/1999 |
| JP | 11-125717 | 5/1999 |
| JP | 11-133231 | 5/1999 |
| JP | 11-160539 | 6/1999 |
| WO | WO 95/27919 | 4/1995 |
| WO | WO 95/17303 | 6/1995 |
| WO | WO 95/17691 | 6/1995 |
| WO | WO 95/17699 | 6/1995 |
| WO | WO 95/17892 | 6/1995 |
| WO | WO 97/01440 | 1/1997 |
| WO | WO 97/01774 | 1/1997 |
| WO | WO 99/36248 | 7/1999 |
| WO | WO 99/36262 | 7/1999 |

OTHER PUBLICATIONS

Weber et al, "Giant Birefringent Opitcs in Multilayer Polymer Mirrors," Science, vol. 287, Mar. 31, 2000, pp. 2451-2456.

* cited by examiner

CHOLESTERIC LIQUID CRYSTAL OPTICAL BODIES AND METHODS OF MANUFACTURE AND USE

CROSS REFERENCE TO RELATED APPLICATION

This application is a continuation of U.S. application Ser. No. 09/957,724, now U.S. Pat. No. 6,876,427 filed Sep. 21, 2001, now pending.

FIELD OF THE INVENTION

This invention relates to optical bodies such as reflective polarizers, articles containing the optical bodies, and methods of using and making the same. In addition, the invention relates to optical bodies containing cholesteric liquid crystal compositions.

BACKGROUND OF THE INVENTION

Optical devices, such as polarizers and mirrors, are useful in a variety of applications including liquid crystal displays (LCDs). Liquid crystal displays fall broadly into two categories: backlit (e.g., transmissive) displays, where light is provided from behind the display panel, and frontlit (e.g., reflective) displays, where light is provided from the front of the display (e.g., ambient light). These two display modes can be combined to form transflective displays that can be backlit, for example, under dim light conditions or read under bright ambient light.

Conventional backlit LCDs typically use absorbing polarizers and can have less than 10% light transmission. Conventional reflective LCDs are also based on absorbing polarizers and can have less than 25% reflectivity. The low transmission or reflectance of these displays reduces display contrast and brightness and can require high power consumption.

Reflective polarizers have been developed for use in displays and other applications. Reflective polarizers preferentially transmit light of one polarization and preferentially reflect light having an orthogonal polarization. It is preferred that reflective polarizers transmit and reflect light without absorbing relatively large amounts of the light. Preferably, the reflective polarizer has no more than 10% absorption for the transmission polarization. Most LCD's operate over a broad range of wavelengths and, as a consequence, the reflective polarizer typically operates over that broad wavelength range, as well.

SUMMARY OF THE INVENTION

Generally, the present invention relates to optical bodies such as reflective polarizers, articles containing the optical bodies, and methods of using and making the same. In addition, the invention relates to optical bodies containing cholesteric liquid crystal compositions. One embodiment is an optical body that includes a) first particles comprising a first cholesteric liquid crystal material and b) a second cholesteric liquid crystal material. The first particles and the second cholesteric liquid crystal material form a structure where the first cholesteric liquid crystal material has a pitch that is different than the second cholesteric liquid crystal material. In one example, the second cholesteric liquid crystal material is in the form of second particles. In another example, the first particles are dispersed in a matrix of the second cholesteric liquid crystal material. In other examples, the optical body has more than one layer. In addition, one or more additional cholesteric liquid crystal materials can be used in the optical body. These optical bodies can be used as a reflective polarizer and can be used in a display.

Another embodiment is a method of making an optical body. First particles comprising a first cholesteric liquid crystal composition are disposed on a substrate. A second cholesteric liquid crystal composition is also disposed on the substrate to form a structure with the first cholesteric liquid crystal composition. The first and second cholesteric liquid crystal compositions are converted into first and second cholesteric liquid crystal materials, respectively. The first cholesteric liquid crystal material has a pitch different than the second liquid crystal material. In one example, the second cholesteric liquid crystal material is in the form of second particles. In another example, the first particles are dispersed in a matrix of the second cholesteric liquid crystal material. In other examples, the optical body has more than one layer. In addition, one or more additional cholesteric liquid crystal materials can be used in the optical body.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
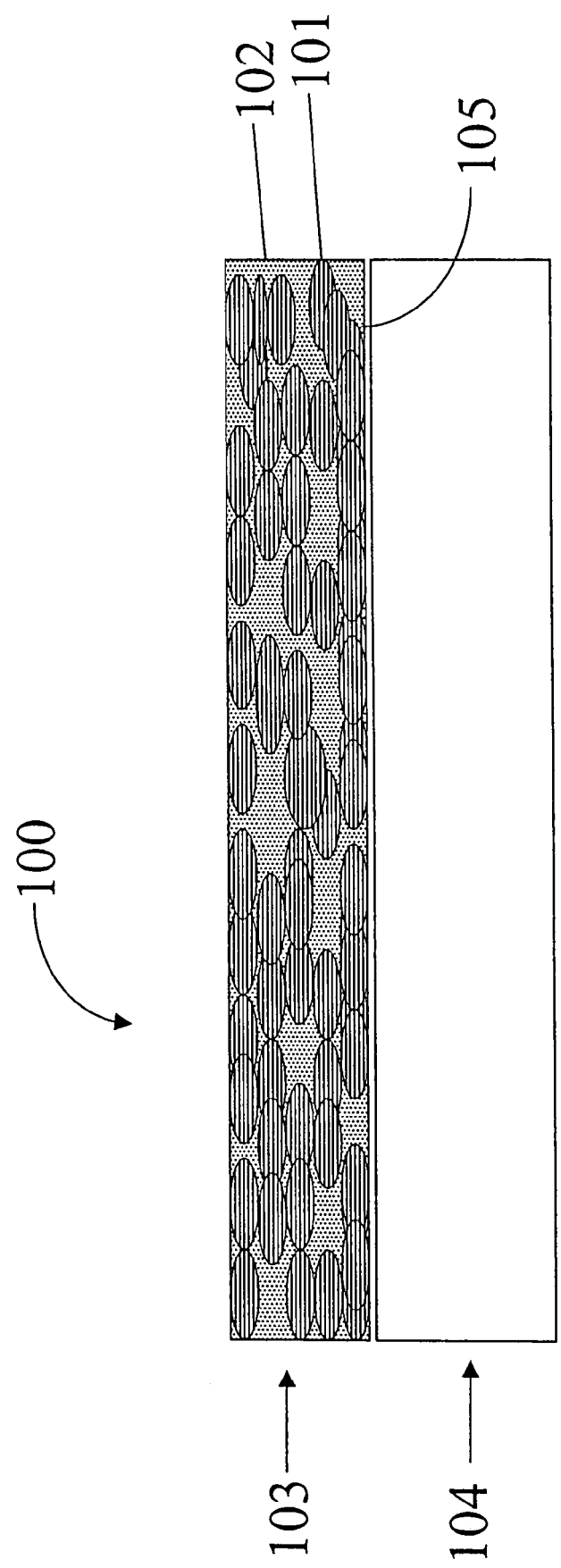
FIG. 1A is a schematic cross-sectional view of an optical body having a structure containing particles of a first cholesteric liquid crystal material distributed in a matrix of a second cholesteric liquid crystal material.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to optical bodies and methods for polarizing light. In particular, the present invention is directed to optical bodies and methods of polarizing light through the use of cholesteric liquid crystal compositions. At least one of the cholesteric liquid crystal compositions is in a particulate form. While the present invention is not so limited, an appreciation of various aspects of the invention will be gained through a discussion of the examples provided below.

Cholesteric liquid crystals can selectively reflect light of a particular circular polarization and transmit light of the orthogonal polarization. Consequently, cholesteric liquid crystals can be used to make reflective polarizers. The wavelength of light that is reflected depends on the pitch and indices of refraction of the liquid crystal material. The pitch is defined as the distance over which the liquid crystal director, which is a unit vector pointing in the direction of local orientation, undergoes a 360° twist. The helical twist of the director results in a spatially periodic variation in the dielectric tensor of the material, which in turn gives rise to a wavelength selective reflection of light. For light propagating along the helical axis, Bragg reflection generally occurs when the wavelength, λ, is in the following range $$n_o p < \lambda < n_e p$$

where p is the pitch, $n_e$ is the refractive index of the cholesteric liquid crystal for light polarized parallel to the director of the liquid crystal, and $n_o$ is the refractive index of the cholesteric liquid crystal for the light polarized perpendicular to the director of the liquid crystal. For example, the pitch can be selected such that the Bragg reflection is peaked in the visible, ultraviolet, or infrared wavelength regimes of light.

The central wavelength $\lambda_o$ of the wavelength range of light reflected by the cholesteric liquid crystal is approximated by $$\lambda_o = 0.5(n_o + n_e)p.$$

The spectral width, $\Delta\lambda_o$, is approximated by $$\Delta\lambda_o = 2\lambda_o(n_e - n_o)/(n_e + n_o) = p(n_e - n_o).$$

The spectral width (measured as full width at half peak height) of a cholesteric liquid crystal composition is typically about 100 nm or less. This limits the usefulness of a cholesteric liquid crystal polymer when reflectivity over the entire visible light range (about 400 to 750 nm) or other wavelength range substantially larger than 100 nm is desired. Birefringence of the material corresponds to $n_e - n_o$.

To make a reflective polarizer capable of reflecting a broad range of wavelengths, multiple cholesteric liquid crystals can be used. One conventional approach has been to make polarizers with multiple layers of cholesteric liquid crystals. Each layer has a different pitch and, therefore, reflects light having a different wavelength. With a sufficient number of layers, a polarizer can be constructed that reflects a large portion of the visible light spectrum. These constructions tend to have a non-uniform transmission or reflection spectra because each layer reflects a different region of light. The uniformity can be improved somewhat by allowing some diffusion of the liquid crystals between the various layers during construction. This can result in an averaging of the pitches between the various layers.

The optical bodies of the invention are formed by disposing at least two different cholesteric liquid crystal materials on a substrate. Preferably, the surface of the substrate (e.g., the surface of an alignment layer provided as part of a substrate) has a surface alignment feature that can improve or provide uniformity of alignment of the cholesteric liquid crystal material disposed thereon. A surface alignment includes any surface features that produce alignment of the director of the liquid crystal material at that surface. Surface alignment features can be produced by a variety of different methods including, for example, unidirectional rubbing of the substrate, stretching the substrate, or photoalignment of a photopolymerizable material by polarized light.

At least one of the cholesteric liquid crystal materials is disposed as a plurality of individual particles. The pitches of the cholesteric liquid crystal materials are different. The pitch is generally selected to be on the order of wavelength of light of interest. For example, the pitch can be selected to be on the order of visible, ultraviolet, or infrared wavelengths of light.

Nematic liquid crystals are typically elongated molecules which, when in solution or other liquid phase, tend to align parallel to one another. Chiral nematic liquid crystals (e.g., cholesteric liquid crystals) are molecules which contain one or more chiral groups. While the nematic character of chiral nematic liquid crystals produces a tendency toward parallel alignment, the chiral groups modify this tendency, so that chiral nematic molecules tend to align parallel to one another in layers, but with the director for each layer pointing in an incrementally different direction, so that the director traces a helical path as it progresses through the chiral nematic layers. Layers of this configuration can be referred to as cholesteric mesophases. An important feature of nematic and chiral nematic liquid crystals is that in many cases, chiral nematic liquid crystals can be added to nematic liquid crystals to form cholesteric mesophases having pitches which depend upon the amount of chiral nematic liquid crystal added. It therefore becomes possible to design a cholesteric layer which reflects light of a particular wavelength range.

Cholesteric liquid crystal materials typically include molecular units that are chiral and mesogenic in nature. As used herein, a "chiral" unit is an asymmetrical unit containing a chiral carbon, (e.g., units that do not posses a mirror plane). A chiral unit is capable of rotating a plane of polarized light to either the left or the right in a circular direction. As used herein, a "mesogenic" unit is a unit having a rod-like and rigid structure that facilitates the formation of a cholesteric liquid crystal phase.

Cholesteric liquid crystal materials can be polymeric and can be formed as a reaction product of chiral monomers and, optionally, achiral monomers. For example, cholesteric liquid crystal materials can be prepared from the polymerization of chiral liquid crystal compounds (e.g., chiral nematic liquid crystal compounds), from the copolymerization of a chiral non-liquid crystal compounds (as the chiral monomers) with nematic liquid crystal compounds (as the achiral monomers), or from the copolymerization of chiral liquid crystal compounds (as the chiral monomers) with nematic liquid crystal compounds (as the achiral monomers). As used herein, a "nematic" liquid crystal compound refers to a liquid crystal compound that is not chiral in nature. Nematic liquid crystal compounds can be used to modify the pitch of cholesteric liquid crystal material. The pitch depends on the relative ratios by weight of the chiral compound and the nematic liquid crystal compound. It will also be understood that non-liquid crystal achiral monomers can be used with cholesteric liquid crystal monomers.

Cholesteric liquid crystal polymers typically include a mesogenic group. Suitable mesogenic groups include, for example, para-substituted cyclic groups such as para-substituted benzene rings. The mesogenic groups are optionally bonded to a polymer backbone through a spacer. The spacer can contain functional groups having, for example, benzene, pyridine, pyrimidine, alkyne, ester, alkylene, alkene, ether, thioether, thioester, and amide functionalities. The length or type of spacer can be altered to provide different solubilities in solvents.

Suitable cholesteric liquid crystal polymers include polymers having a chiral or achiral polyester, polycarbonate, polyamide, polyacrylate, polymethacrylate, polysiloxane, or polyesterimide backbone that includes mesogenic groups optionally separated by rigid or flexible comonomers. Other suitable cholesteric liquid crystal polymers have a polymer backbone (for example, a polyacrylate, polymethacrylate, polysiloxane, polyolefin, or polymalonate backbone) with chiral or achiral (or both) mesogenic side-chain groups. The side-chain groups are optionally separated from the backbone by a spacer, such as an alkylene or alkylene oxide spacer, to provide flexibility. The resulting polymers can be linear, branched, or crosslinked. The compositions can be tailored by choice of chiral and achiral monomers to prepare polymers that reflect light of a desired wavelength range.

Examples of suitable cholesteric liquid crystal polymers are described in U.S. Pat. Nos. 4,293,435, 5,332,522, 5,886, 242, 5,847,068, 5,780,629, and 5,744,057, all of which are incorporated herein by reference. Other cholesteric liquid crystal materials can also be used. Typically, a cholesteric liquid crystal material is selected for a particular application or optical body based on one or more factors including, for example, refractive indices, pitch, processability, clarity, color, low absorption in the wavelength range of interest, compatibility with other components (e.g., compatibility with a nematic liquid crystal compound), ease of manufacture, availability of the liquid crystal material or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

As used herein, the term "cholesteric liquid crystal composition" refers to a composition comprising a cholesteric liquid crystal compound, a cholesteric liquid crystal polymer, or lower molecular weight compounds including monomers and oligomers that can be reacted to form a cholesteric liquid crystal polymer. The cholesteric liquid crystal composition can also include one or more other additives such as, for example, crosslinking agents and polymerization initiators.

Polymerization initiators can be included within the cholesteric liquid crystal composition to initiate polymerization or crosslinking of monomeric or other lower molecular weight compounds of the composition. Suitable polymerization initiators include those that can generate free radicals to initiate and propagate polymerization or crosslinking. Free radical initiators can also be chosen according to, for example, stability or half-life. Preferably the free radical initiator does not generate any additional color in the cholesteric liquid crystal layer by absorption or otherwise. The free radical initiators are typically either thermal free radical initiators or photoinitiators. Thermal free radical initiators include, for example, peroxides, persulfates, or azonitrile compounds. These free radical initiators generate free radicals upon thermal decomposition.

Photoinitiators can be activated by electromagnetic radiation or particle irradiation. Examples of suitable photoinitiators include onium salt photoinitiators, organometallic photoinitiators, cationic metal salt photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources can be used. Photoinitiators can be chosen based on the absorption of particular wavelengths of light.

The cholesteric liquid crystal composition can be part of a coating composition that typically includes one or more solvents. The coating composition can also include, for example, dispersing agents, anti-oxidants, and anti-ozonants. Additionally, the coating composition can include various dyes and pigments for absorbing ultraviolet, infrared, or visible light, if desired. In some instances, it may also be appropriate to add viscosity modifiers such as thickeners and fillers. Also, in some instances, it may be useful to add coalescing agents to improve the intimacy of contact between particles after deposition onto the substrate. In addition, it has been found that some non-liquid crystal compounds, such as polyethylene glycols, polyethylene glycol(meth)acrylates, and methyoxypolyethoxy(meth)acrylates, as well as other (meth)acrylates such as 3-methacryloxypropyl trimethoxysilane and others with relatively low glass transition temperatures ($T_g$), can improve the transmission of alignment through layers of particles. These components may act as internal plasticizers, as described below, when copolymerized with liquid crystal monomers. Generally, these compounds are less than 10 wt. % of the total amount of monomeric material used to make a cholesteric liquid crystal polymer.

The coating compositions containing cholesteric liquid crystal materials can be applied to the substrate by a variety of liquid coating methods. In at least some embodiments, the surface of the substrate (e.g., the surface of an alignment layer) is aligned prior to coating. After coating, a cholesteric liquid crystal composition is polymerized or otherwise converted into a cholesteric liquid crystal material. This conversion can be accomplished by a variety of techniques including evaporation of a solvent; heating to align the cholesteric liquid crystal material; crosslinking the cholesteric liquid crystal composition or compositions; or curing (e.g., polymerizing) the cholesteric liquid crystal composition using, for example, heat, radiation (e.g., actinic radiation), light (e.g., ultraviolet, visible, or infrared light), an electron beam, or a combination of these or like techniques.

As a result of the coating and conversion to cholesteric liquid crystal materials, a cholesteric reflective polarizer that is effective over a wide range of wavelengths can be produced, if desired. In some embodiments, the cholesteric reflective polarizer substantially reflects light over a spectral width of at least 100, 150, 200, or 300 nm or more measured as full width at half peak height of the reflection spectrum.

Surprisingly, this reflective polarizer can have a relatively low level of optical diffusion. This property has previously been associated with highly homogeneous bodies. On the other hand, the wide spectral range of polarization effectiveness that can be achieved with these optical bodies would tend to suggest that the various particles having different pitches are maintaining discrete identities. While not wishing to be bound by any particular theory, it is thought that the deposited particles of cholesteric liquid crystalline materials coalesce without completely mixing, so that each particle maintains a pitch which at least approximates its pitch prior to deposition onto the substrate. Moreover, it is thought that a propagation phenomenon can occur between particles, without complete mixing, wherein the alignment imposed on the layer of cholesteric liquid crystal material in contact with the substrate is propagated throughout the layer and through all of the particles despite their differing pitches. It has been found that improved coalescence of particles generally leads to improved polarization effectiveness of the reflective polarizers, without significant loss of spectral range in polarization.

In describing each of the optical bodies, it will be understood that the substrate preferably has surface alignment features, for example, an alignment layer. Preferably, these surface alignment features are provided prior to disposing the cholesteric liquid crystal material on the substrate. Alternatively, surface alignment features can be provided after disposition and the cholesteric liquid crystal material is aligned thereafter (e.g., by heating to align the material).

FIG. 1A is a schematic cross-sectional view of one embodiment of the invention. The optical body 100 includes a substrate 104 and a structure 103 containing at least two cholesteric liquid crystal materials. In this embodiment, structure 103 is disposed on the substrate 104 and contains particles 101 of a first cholesteric liquid crystal material distributed in a matrix 102 of a second cholesteric liquid crystal material. The distribution of particles in the matrix can be uniform or non-uniform. Particles 101 can be present in sufficiently high concentration to produce contact between particles, as shown in FIG. 1A, or the particles can be present in lower concentrations where few particles make contact with each other. The first and second cholesteric liquid crystal materials have different pitches.

Each cholesteric liquid crystal material reflects circularly polarized light over a range of wavelengths determined by the birefringence and pitch of the material. If a structure such as 103 in FIG. 1A contains two or more different cholesteric liquid crystal materials, optical body 100 can reflect a broader range of wavelengths than one containing a single cholesteric liquid crystal material. More specifically, the structure can reflect two wavelength regions: one region is associated with the first cholesteric liquid crystal material and the other region is associated with the second cholesteric liquid crystal material. A structure such as 103 can be heated so that at least some molecules of one or both cholesteric liquid crystal compositions diffuse into the other cholesteric liquid crystal composition in the process of forming the structure. The diffusion results in the formation of a region with pitches intermediate between that of the first and second cholesteric liquid crystal materials. Diffusion can result in a broadening of the wavelength regions over which the structure reflects light.

Figure 1B:
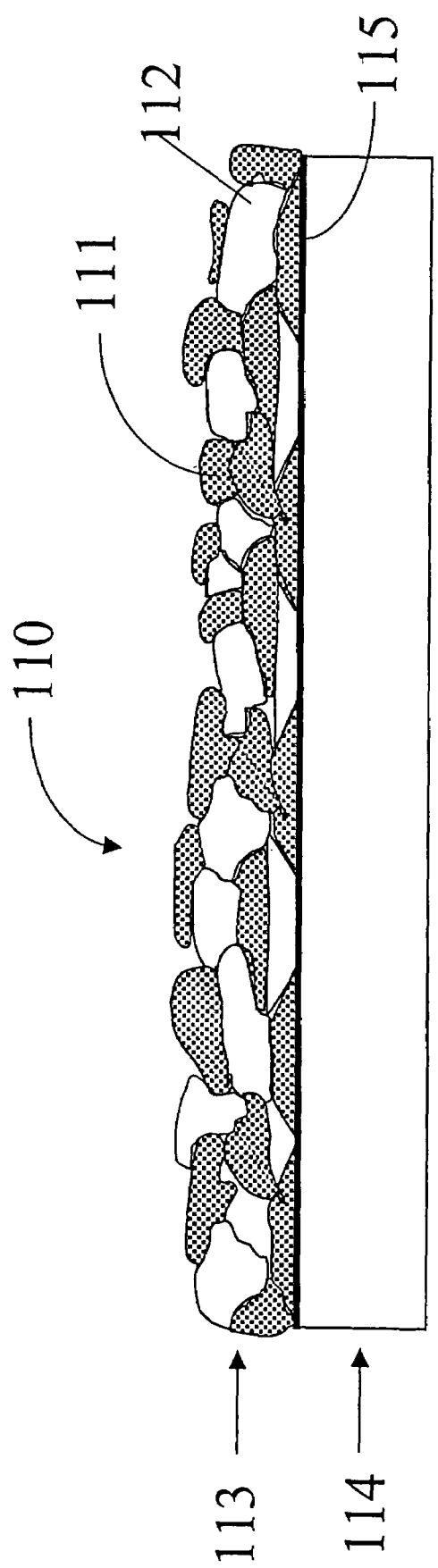
FIG. 1B is a schematic cross-sectional view of an optical body having a structure containing particles of first and second cholesteric liquid crystal materials.

FIG. 1B is a schematic cross-sectional view of an optical body 110 in which the first and second cholesteric liquid crystal materials, 111 and 112 respectively, are both in particulate forms. The particles combine to form a structure 113 on the substrate 114. The two cholesteric liquid crystal materials have different pitches. The particles can have the same or different average particle sizes and can be uniformly or non-uniformly distributed. In one embodiment, the particles of the second material are smaller than the particles of the first material and some segregation of the particles results from the difference in particle size or specific gravity.

Figure 1C:
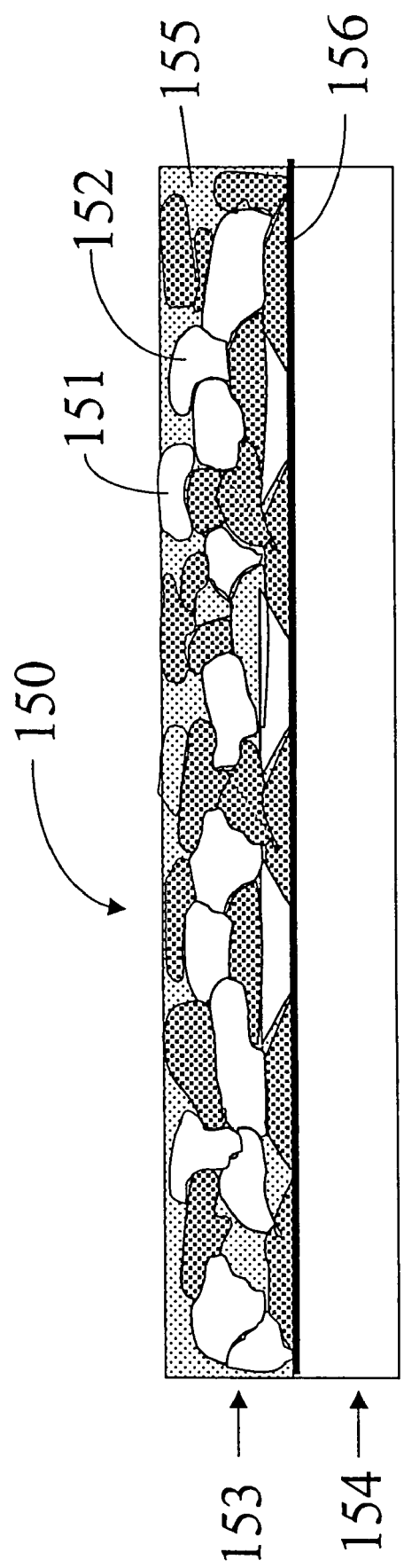
FIG. 1C is a schematic cross-sectional view of an optical body having a structure containing particles of first and second cholesteric liquid materials distributed in a matrix of a third cholesteric liquid crystal material.

FIG. 1C is a schematic cross-sectional view of an optical body 150 that includes a structure 153 that contains at least two cholesteric liquid crystal materials disposed on the substrate 154. The first and second cholesteric liquid crystal materials are in the form of particles 151 and 152. These two materials are distributed in a matrix 155. The matrix can be a third cholesteric liquid crystal material or a polymer without liquid crystal characteristics. If matrix 155 material is not a liquid crystalline material, there is preferably at least some interparticle contact, so as to improve the uniformity of alignment of the liquid crystalline phase between particles 151, 152 to improve the uniformity of alignment of the liquid crystal materials. Although all the cholesteric liquid crystal materials have different pitches, it has been found possible to produce substantially uniform cholesteric alignment throughout structure 153.

Figure 1D:
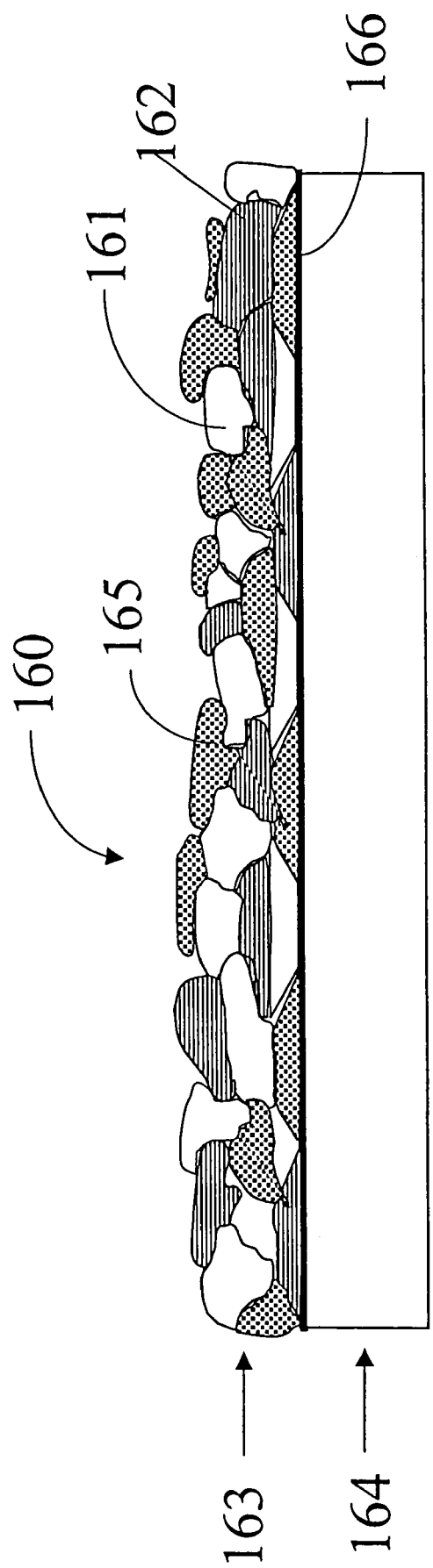
FIG. 1D is a schematic cross-sectional view of an optical body having a structure containing particles of first, second, and third cholesteric liquid crystal materials.

FIG. 1D is a schematic cross-sectional view of an optical body 160 that includes a structure 163 that contains three cholesteric liquid crystal materials disposed on the substrate 164. All three cholesteric liquid crystal materials are in the form of particles 161, 162, and 165. Although each cholesteric liquid crystal material has a pitch that is different than the other materials, it has been found that a substantially uniform cholesteric alignment can be achieved throughout structure 163. The particles can be of the same or different average size and can be distributed uniformly or non-uniformly.

The optical bodies of the invention can contain more than three cholesteric liquid materials. At least one of the materials is in the form of particles. All or any number of the remaining materials can be particulate.

Figure 2A:
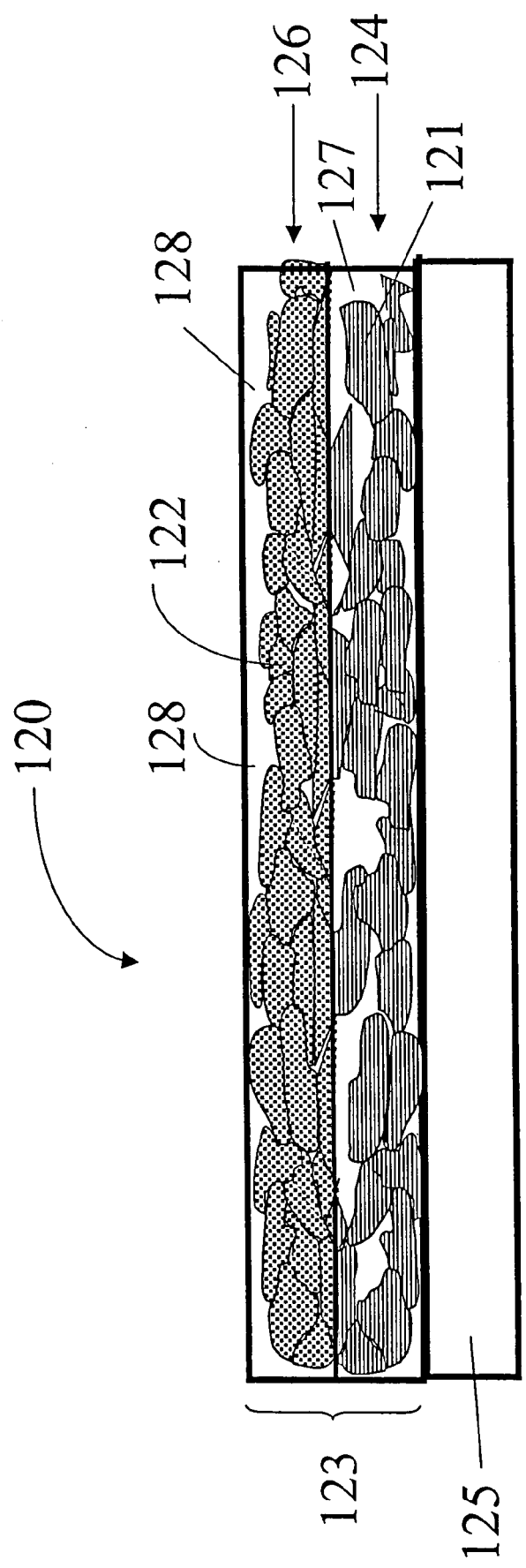
FIG. 2A is a schematic cross-sectional view of an optical body having a structure With two layers in which each layer contains particles of a different cholesteric liquid crystal material distributed in a matrix.

The structure formed between two cholesteric liquid crystal materials can contain one or more layers. FIG. 2A is the schematic cross-sectional view of an optical body 120 in which the various cholesteric liquid crystal materials form a structure 123 having multiple layers 124, 126. Layer 124 is between the substrate 125 and layer 126. Each layer contains a cholesteric liquid crystal material in a particulate form. Layer 124 contains particles 121 of a first cholesteric liquid crystal material distributed in a matrix 127 and layer 126 contains particles 122 of a second cholesteric liquid crystal material distributed in a matrix 128. The matrix is a polymeric material and can be a cholesteric liquid crystal material, if desired. Matrix 127 and matrix 128 can be the same or different material.

One or more of the layers in the structure above the substrate can contain multiple cholesteric liquid crystal materials. In one embodiment of FIG. 2A, the layer 124 closest to the substrate 125 contains particles of a first cholesteric liquid crystal material 121 distributed in a matrix of a third cholesteric liquid crystal material 127. Layer 126 contains particles of a second cholesteric liquid crystal material 122 distributed in a matrix of a fourth cholesteric liquid crystal material 128. The four cholesteric liquid crystal materials all have different pitches. The average size of the particles in layers 124 and 126 can be of the same or different.

In another embodiment of FIG. 2A, there are three cholesteric liquid crystal materials, each of which has a different pitch. Three cholesteric liquid crystal compositions can result when the matrixes 127, 128 are the same cholesteric liquid crystal material. Each layer of the structure has two cholesteric liquid crystal materials.

Alternatively, either matrix 127, 128 can be a cholesteric liquid crystal material and the other is a polymeric material without liquid crystal characteristics. One layer of the structure has two cholesteric liquid crystal materials while the other layer has only one cholesteric liquid crystal material. Either layer can be the one containing two cholesteric liquid crystal materials.

In yet another embodiment of FIG. 2A, there are two cholesteric liquid crystal materials, each of which has a different pitch. Such a structure can result when the matrixes 127 and 128 are not cholesteric liquid crystal polymers. The only cholesteric liquid crystal materials in the structure are particles 121 and 122.

Figure 2B:
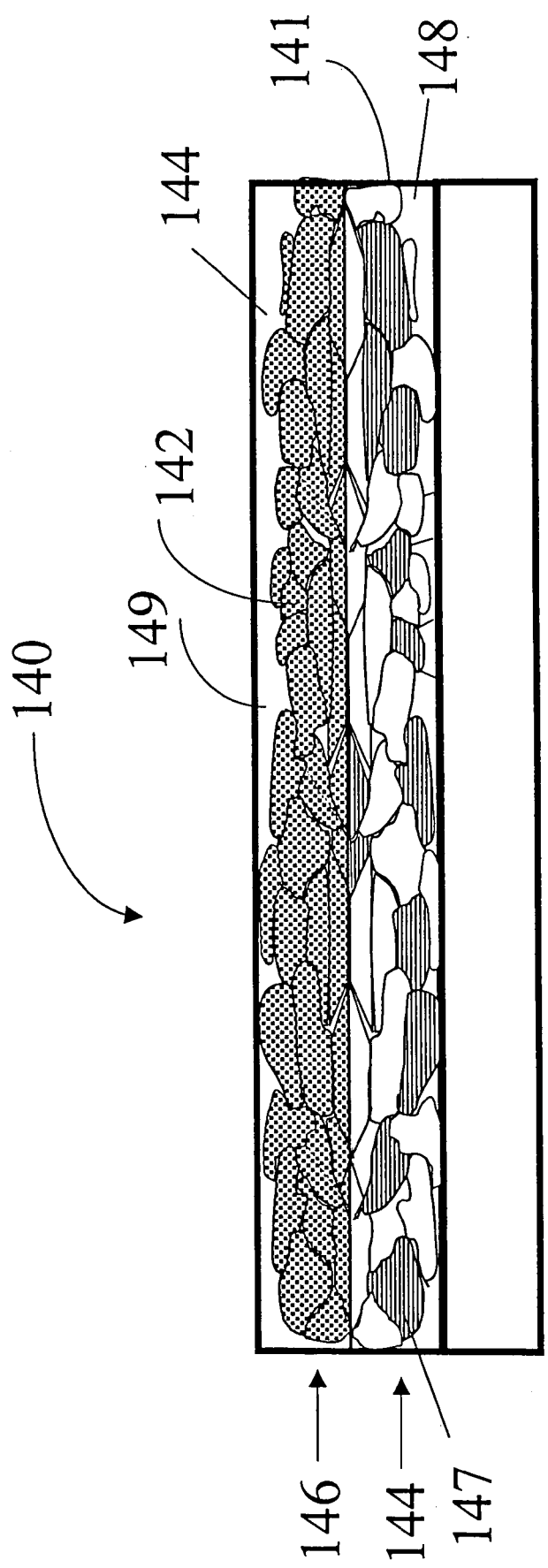
FIG. 2B is a schematic cross-sectional view of an optical body having a structure with two layers in which each layer contains particles of one or more liquid crystal materials distributed in a matrix.

FIG. 2B is a schematic cross-sectional view of another optical body of the invention having a structure with multiple layers. The layer 144 closest to the substrate 145 contains particles of two cholesteric liquid crystal materials 141, 147 in matrix 148. Layer 146 is formed over layer 144 and contains particles 142 of a third cholesteric liquid crystal material in matrix 149. The matrices 148, 149 can be the same or different. The matrices are polymeric materials and can be cholesteric liquid crystal materials. If either matrix material 148, 149 is not a liquid crystal material, it is preferred that particles 141, 142, 147 be in sufficiently intimate contact, by, for example, coalescence, to produce substantially uniform cholesteric alignment throughout structures 144, 146. The cholesteric liquid crystal materials all have different pitches. The average size of the particles 141, 142, 147 can be of the same or different.

The optical bodies of the invention can have structures with more than two layers that each contain particles of at least one cholesteric liquid crystal composition. Optionally, each layer can contain particles of more than one cholesteric liquid crystal composition. Each layer can contain a matrix in which the various particles are distributed. The matrix is a polymeric material and can be a cholesteric liquid crystal material. The matrix of each layer can be the same or different.

It will be recognized that in each of the embodiments described above, the cholesteric liquid crystal compositions or materials can be optionally heated after deposition to provide diffusion between particles of different composition, between particles and a surrounding matrix, or both. This diffusion can typically produce more uniform reflection over a wavelength range. Diffusion provides less distinct boundaries between particles and between particles and the matrix. The amount of diffusion can be controlled by, for example, heating temperature, heating time, viscosity of the materials, and density of the materials.

In at least some embodiments, the use of a larger number of different cholesteric liquid crystal materials in a structure results in a broader range of wavelengths reflected by the polarizer.

The substrate can provide a base for deposition or formation of the structure comprising the various cholesteric liquid crystal materials. The substrate can be a structural support member during manufacture, use, or both. Typically, the substrate is transparent over the wavelength range of operation of the optical body. Examples of substrates include cellulose triacetate (TAC, available from, for example, Fuji Photo Film Co., Tokyo, Japan; Konica Corporation, Tokyo, Japan; and Eastman Kodak Co., Rochester, N.Y.), Sollx™ (available from General Electric Plastics, Pittsfield, Mass.), and polyesters, such as polyethylene terephthalate (PET). In some embodiments, the substrate is not birefringent.

The substrate can have more than one layer. In one embodiment, the substrate contains an alignment layer having a surface capable of orienting a liquid crystal composition disposed on the alignment layer in a fairly uniform direction. Alignment layers can be made using any known mechanical or chemical method. Mechanical methods of making an alignment layer include rubbing or stretching a polymer layer in the desired alignment direction. For example, polyvinyl alcohol, polyamide, and polyimide films can be aligned by rubbing the film in the desired alignment direction. Films that can be aligned by stretching include, for example, polyvinyl alcohol, polyolefins such as polyethylene or polypropylene, polyesters such as polyethylene terephthalate or polyethylene naphthalate, and polystyrene. The polymer film can be a homopolymer, a copolymer, or a mixture of polymers, although homopolymers tend to be easier to align by stretching than are copolymers.

An alignment layer can be formed photochemically. For example, photo-orientable polymers can be formed into alignment layers by irradiation of anisotropically absorbing molecules disposed in a medium or on a substrate with light (e.g., ultraviolet light) that is linearly polarized in the desired alignment direction, as described in U.S. Pat. Nos. 4,974,941, 5,032,009, and 5,958,293, all of which are incorporated by reference. Suitable photo-orientable polymers include polyimides comprising substituted 1,4-benzenediamines.

Another class of photoalignment materials can be used to form alignment layers. These polymers selectively react in the presence of polarized ultraviolet light along or perpendicular to the direction of the electric field vector of the polarized ultraviolet light, which once reacted, have been shown to align liquid crystal materials. Examples of these materials are described in U.S. Pat. Nos. 5,389,698, 5,602,661, and 5,838,407, all of which are incorporated herein by reference. Suitable photopolymerizable materials include polyvinyl cinnamate and other polymers such as those disclosed in U.S. Pat. Nos. 5,389,698, 5,602,661, and 5,838,407. Photoisomerizable compounds, such as azobenzene derivatives are also suitable for photoaligmnent, as described in U.S. Pat. No. 6,001,277, incorporated herein by reference. Alignment layers can also be formed by coating certain types of lyotropic molecules which orient themselves due to shear applied during coating. Molecules of this sort are disclosed in co-assigned pending U.S. patent application Ser. No. 09/708,752, incorporated herein by reference.

In another embodiment, the structure is formed on the substrate and the structure is subsequently removed from the substrate leaving a structure surface.

Figure 3:
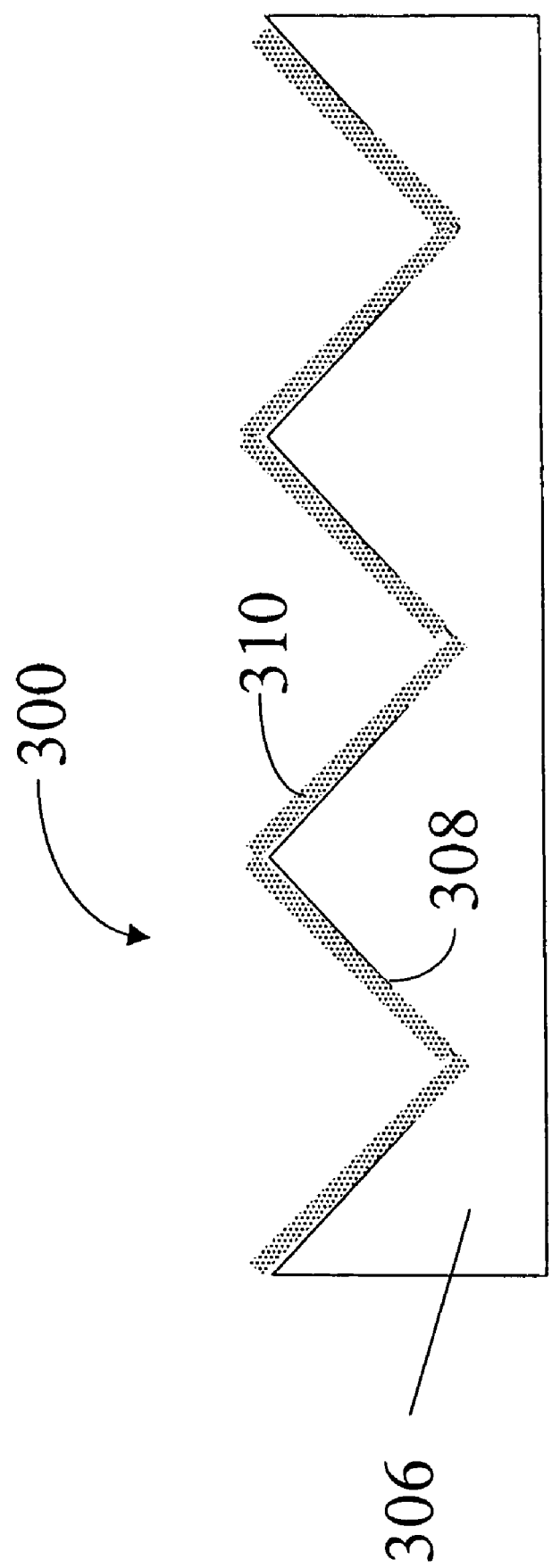
FIG. 3 is a schematic cross-sectional view of a non-flat substrate.

Although FIGS. 1A to 1D, 2A, and 2B show a smooth, flat substrate, the substrate is not so limited. The substrate can be smooth or textured and can be flat or curved. The surface can be uniform or non-uniform in shape and texture. In one embodiment, the surface of the substrate is prismatic in shape as shown in FIG. 3. One or more cholesteric liquid crystal layers 310 are deposited onto the prismatic surface 310.

The optical bodies of the invention can be combined with other optical or physical elements. In one embodiment, a polymeric film is attached to the upper surface of the structure comprising the various cholesteric compositions. For example, a triacetyl cellulose (TAC) film can be attached to the upper surface of the structure using an adhesive. In another embodiment, a laminate can be formed using the substrate and another polymeric film. In one embodiment, a TAC or quarter wave film is laminated to the substrate. Alternatively, the TAC or quarter wave film can be laminated to a layer containing cholesteric liquid crystal polymer material. The quarter wave film can convert the transmitted circularly polarized light into linearly polarized light. After passing through a quarter wavelength film, circularly polarized light is converted to linearly polarized light with its polarization axis + or − 45 degrees away from the optical axis of the quarter wave film, with the direction determined by the specific circular polarization state. In yet another embodiment, the substrate itself can be a quarter wave film.

Each structure depicted in FIGS. 1A to 1D, 2A, and 2B contains a plurality of particles comprising cholesteric liquid crystal material. For illustrative purposes only, the particles are circular and monodisperse. However, the particles can be any shape including, for example, spherical, elliptical, conical, and irregular. The particle size and shape can be uniform or non-uniform. The particle size is not critical, except to the extent that very large particles may produce visible color effects, particularly if the particles are so large that they extend through the entire layer. In one embodiment, the particle sizes are in the size range of 0.05 µm to 5 µm, preferably in the size range of 0.1 µm to 1 µm. Size can be selected by a variety of methods that may depend on the method of formation on the substrate. For example, when spray coating, particle size can be altered by orifice size and pressure, as well as by fluid properties. For emulsion polymerization, particle size can typically be controlled by polymerization conditions, emulsion conditions, and solvent selection. Particles having a cholesteric liquid crystal polymer composition can be prepared by any known technique for forming polymeric particles.

One technique for preparing particles involves emulsion polymerization. The cholesteric liquid crystal polymers or lower molecular weight compounds (e.g., oligomers or monomers) are dissolved in a solvent that is not miscible with water. This composition is combined with water to form an emulsion. A surface-active agent can be used to form droplets of the cholesteric liquid crystal composition in the aqueous phase, if necessary or desired. The compositions within the droplets can be polymerized or cured, if necessary or desired, and the water phase is removed leaving cholesteric liquid crystal particulate material. The use of surface active agents may need to be monitored or controlled so as not to adversely affect alignment of the cholesteric liquid crystal material. Preferably, the surface active agents stabilize the emulsion while present in small amounts. Cationic surfactants are generally less preferable.

In addition to other components of the emulsion, a plasticizing monomer material may be included which can be copolymerized with the monomers that form the cholesteric liquid crystal polymer. The plasticizing monomer material operates to make the cholesteric liquid crystal polymer more flexible, easier to coat as a film, or both. In at least some embodiments, the use of a plasticizing monomer can make the subsequently formed cholesteric liquid crystal polymer into a "self-plasticizing" polymer. Typically, such monomers include flexible alkylene or ether-linked chains with polymerizable functional groups. Examples of such plasticizing monomers include methoxypolyethoxy(meth)acrylates, poly(ethylene glycol)(meth)acrylates (including poly(ethylene glycol)alkylether(meth)acrylates), and other (meth) acrylates, such as 3-methacryloxypropyl trimethoxysilane, and in particular those that have relatively low glass transition temperatures.

In another method of forming particles, the monomers can be polymerized in a solvent miscible with both the monomers and the resulting polymer. The polymer solution can then be added to a second solvent immiscible with the polymer. The second solvent can contain a surface-active agent to facilitate the transfer of the polymer into the second solvent as stable small particles. Alternatively or additionally, the surface-active agent can be copolymerized into the polymer. For example, Sartomer CD550 (available from Sartomer Company, Exton, Pa.), a methoxypolyethylene glycol monomethacrylate with an average molecular weight of 350, BEM-25, (behenylethoxy (25) methacrylate from Bimax Chemicals LTD., Cockeysville, Md.), methoxypolyethoxy-12methacrylate (available from Bimax Chemicals LTD., Cockeysville, Md.), or lauryl methacrylate (available from Aldrich Chemical Co., Milwaukee, Wis.) can be copolymerized at levels of 1 to 20 weight percent with other monomers to prepare a polymeric material with improved compatibility with polar solvents such as water or ethanol.

A variation of the above method is to form a solution of the monomers and add a second solvent immiscible with the monomers. A surface-active agent could facilitate the formation of droplets of the cholesteric liquid crystal composition in the second solvent. The droplets could also contain the necessary agents for polymerization and crosslinking to form particulate cholesteric liquid crystal material.

Yet another method for making particles of a cholesteric liquid crystal composition involves directly spraying a solution of the cholesteric liquid crystal composition onto the substrate using, for example, an aerosol sprayer. The cholesteric liquid crystal composition can contain either previously prepared polymers or lower molecular weight compounds such as oligomers or monomers in addition to crosslinking agents and polymerization initiators. The distance the sprayer is held from the substrate can be used to vary the particle size. Typically, holding the sprayer further away from the substrate produces smaller particles. If the particles are too large, there is a greater likelihood of coalescence.

Spray drying is another known technique for making particles. A previously prepared polymer in solution can be sprayed into droplets of polymer and solvent. The solvent can evaporate leaving particles of the polymer. These particles can be collected. With this technique, the particles are not be formed directly on the substrate but can be disposed later on the substrate in a separate step.

The invention includes methods of preparing the optical bodies of the invention. In the first method, a plurality of particles having a first cholesteric liquid crystal composition are disposed on a substrate. A second cholesteric liquid crystal composition is also disposed on the substrate to form a structure with the particles of the first cholesteric liquid crystal composition. The structure is heated to align the cholesteric liquid crystal compositions and optionally form a diffuse region between the various cholesteric liquid crystal compositions. This method could be used, for example, to prepare the optical bodies depicted in FIGS. 1A and 1B.

One embodiment of this method involves directly spraying or otherwise forming the first and second cholesteric liquid crystal compositions onto the substrate using, for example, an aerosol sprayer or atomizer. Such a method of disposing the first and second cholesteric liquid crystal compositions can result in the structure depicted in FIG. 1B. The compositions can be sprayed sequentially or simultaneously using one or more sprayers. The various cholesteric compositions can be mixed before spraying. Each cholesteric liquid crystal compositions can contain the cholesteric liquid crystal polymers as well as solvents and other additives such as surface-active agents. The sprayer is generally held at an appropriate distance from the substrate to form particles in the size range desired.

Alternatively, separate emulsions can be formed for the two cholesteric liquid crystal compositions and then these two emulsions can be mixed together. The combined emulsions can be roll-coated, dried, and diffused to give the structure depicted in FIG. 1B.

A structure such as that depicted in FIG. 1D can be prepared by spraying three cholesteric liquid crystal compositions on the substrate. The compositions can be sprayed sequentially or simultaneously using one or more sprayers. The spray can contain cholesteric liquid crystal polymers as well as solvents and other additives such as surface-active agents. Alternatively, emulsions could be used to form the structure as described for FIG. 1B.

Figure 11:
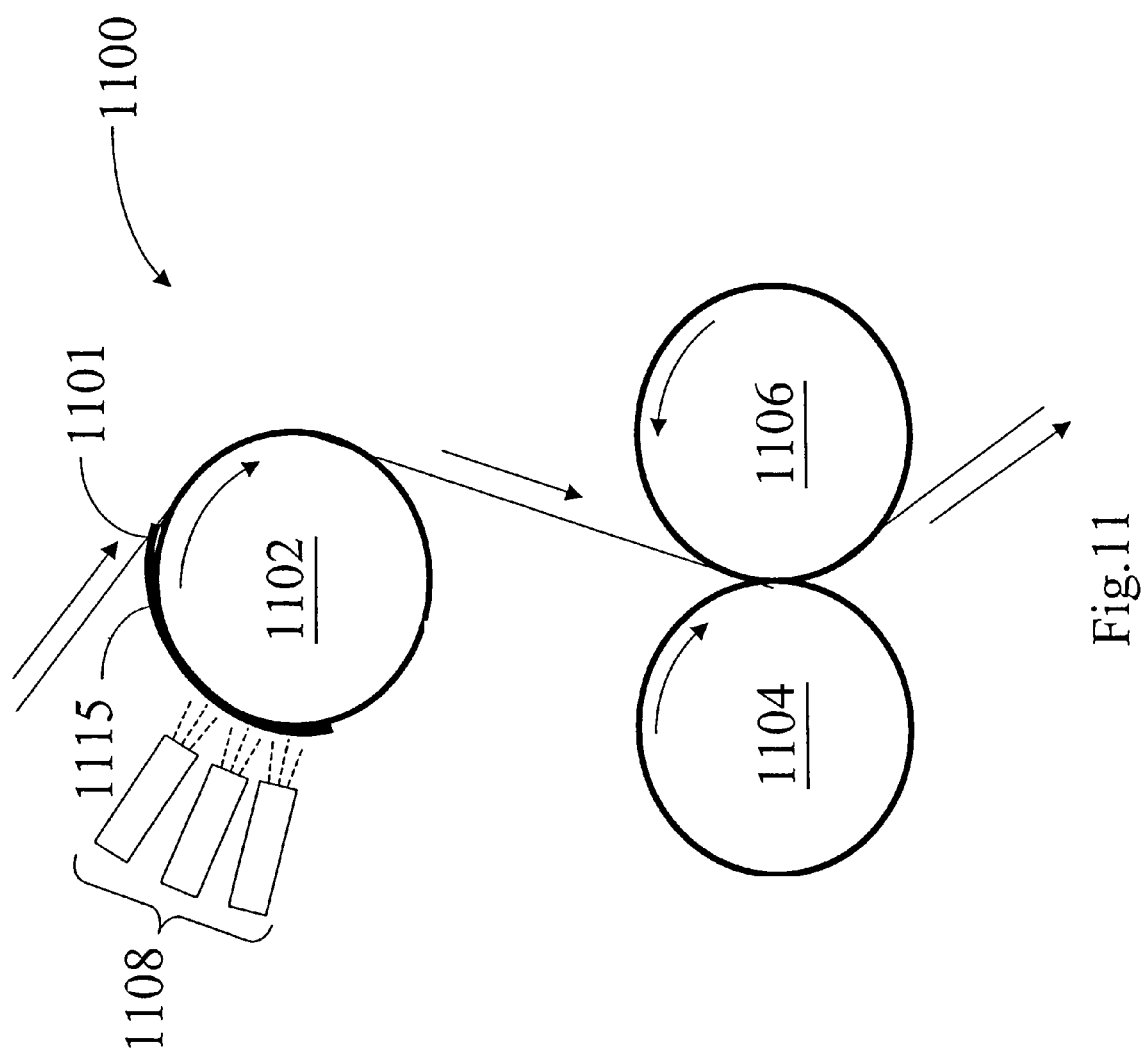
FIG. 11 is a schematic representation of one method of disposing cholesteric liquid crystal compositions on a substrate in particulate form.

Another method of coating is illustrated in FIG. 11. The cholesteric liquid crystal compositions are sprayed from a series of sprayers 1108 onto a coating roll 1102 to form a layer 1115 on the coating roll. The coating roll 1102 then applies the layer 1115 to a substrate 1101, which then passes between rolls 1104 and 1106. Either one or both of rolls 1104 and 1106 can be heated to promote drying and alignment of the cholesteric layers. Also, while roll 1104 may be useful for smoothing layer 1115 and perhaps helping to align it, roll 1104 may not be needed, in some instances.

In other embodiments, particles of a first cholesteric liquid crystal material are mixed with binders to form a coating composition. As used herein, the term "binder" refers to either a polymeric material or lower molecular weight compounds that can react to form polymeric material. The binder also includes any polymerization initiator or crosslinking agent needed to form polymeric material from the monomers or oligomers. The binder is the matrix forming material. The binders can be cholesteric liquid crystal compositions or compositions without liquid crystal characteristics. In addition to particles and binders, the coating composition can contain, for example, surface-active agents, one or more solvents, anti-oxidants, dyes, pigments, and additional monomers to alter the properties of the binder. The coating composition is applied to the substrate using any known method including, for example, spray coating, rod coating, slide coating, curtain coating, extrusion coating, and combinations thereof.

After application of the coating composition to the substrate, the solvents are removed by evaporation and the binders are cured, if necessary. The cured binder results in a polymeric matrix surrounding the particles of cholesteric liquid crystal material. One example of a suitable range of particle concentration within a matrix is from 30% to 100% (corresponding to no matrix). If the particle concentration is sufficiently low that the particles do not make substantial intimate contact with one another after coating, it is preferred that the binder material be a cholesteric liquid crystal material so that the alignment can be propagated throughout the layer. In one embodiment, a layer contains a total thickness of cholesteric liquid crystal material of 5 to 10 micrometers when dried.

The cholesteric liquid crystal compositions can include a crosslinking agent. The agent can function to crosslink polymers in one cholesteric liquid crystal composition. Alternatively, the agent can function to crosslink polymers in several cholesteric liquid crystal compositions. For example, a reactive monomer in a second cholesteric liquid crystal composition such as a di(meth)acrylate, a diepoxide, a divinyl, or a diallyl ether can diffuse into a first cholesteric liquid crystal composition. The reactive monomer material can crosslink with either the first or second cholesteric liquid crystal composition. Crosslinking "fixes" the cholesteric liquid crystal material and prevents or substantially reduces any further diffusion of the material. Crosslinking decrease the availability of low molecular weight materials, the materials that can easily diffuse.

Crosslinking helps prevent later mixing of the various cholesteric liquid crystal materials by heat-induced diffusion. This is particularly advantageous in applications where the optical bodies can be subjected to substantial heat during their normal use, such as in many display applications. Continued diffusion of the cholesteric liquid crystal materials could result in optical property changes over time. Crosslinking can produce structures of cholesteric liquid crystal materials that are substantially more stable over time and can be used to produce a more reliable product with a longer lifetime.

To prepare the optical bodies depicted in FIG. 1A, a coating composition is prepared containing particles of a first cholesteric liquid crystal material and a binder of a second cholesteric liquid crystal composition. The second cholesteric liquid crystal composition contains either a cholesteric liquid crystal polymer or lower molecular weight compounds that can be polymerized. A diffuse region can form if the particles of the first cholesteric liquid crystal material are slightly soluble in the second cholesteric liquid crystal composition. If there are low molecular weight cholesteric liquid crystal compounds in the composition, the monomers can diffuse to some extent prior to curing or crosslinking leading to changes in the pitch within the diffuse region.

A structure such as that depicted in FIG. 1C can be prepared by forming a coating composition containing particles of first and second cholesteric liquid crystal materials in a binder. The binder can contain a third cholesteric liquid crystal composition. Alternatively, the binder can contain polymers or monomers without liquid crystal characteristics. The coating composition is disposed on the substrate using any suitable coating technique such as, for example, spray coating, rod coating, slide coating, curtain coating, extrusion coating, and combinations thereof.

In still another embodiment, the particles of the first cholesteric liquid crystal composition can be sprayed on the substrate. Then the second cholesteric liquid crystal composition can be disposed over the particles of the first cholesteric liquid crystal material using any suitable coating technique such as, for example, spray coating, rod coating, slide coating, curtain coating, extrusion coating, and combinations thereof.

Another method of the invention includes forming a structure on the substrate containing more than one layer. The layers can be formed simultaneously or sequentially. The individual layers can be formed using any of the embodiments discussed above. A plurality of particles having a first cholesteric liquid crystal composition are disposed in a first layer adjacent to the substrate and particles having a second cholesteric crystal composition are disposed in a second layer over the first layer. The structure is heated to align the various cholesteric liquid crystal compositions on the substrate. The temperature used for alignment depends, at least in part, on the cholesteric liquid crystal materials and the method used for alignment.

Heating can also optionally promote diffusion of polymers or monomers into adjacent cholesteric liquid crystal compositions resulting in an alteration of the pitches of the cholesteric liquid crystal compositions within the area of diffusion. Such diffusion tends to favor the formation of a structure having a broader spectral bandwidth for reflected light. This method could be used, for example, to prepare the optical bodies depicted in FIGS. 2A and 2B.

The method can further include curing the various cholesteric liquid crystal compositions to form the corresponding cholesteric liquid crystal materials. Curing, crosslinking, or both can reduce or prevent further diffusion of the various materials over time. Additionally, the mechanical and environmental stability of the structure can often be improved by a higher degree of polymerization and crosslinking. The curing and crosslinking steps can be performed after application of each layer or after application of all layers or any combination of layers.

In one embodiment, two separate coating compositions are prepared. The first coating composition contains particles of the first cholesteric liquid crystal material while the second contains particles of the second cholesteric liquid crystal material. Each coating composition can also contain a binder. The binder comprises a polymeric material or lower molecular weight compounds that can be reacted to form polymeric material. The binder can be a cholesteric liquid crystal composition, but can alternatively contain polymeric material without liquid crystal characteristics. The binders can contain various other compounds such as crosslinking agents and polymerization initiators. Additionally, the coating compositions can contain, for example, surface-active agents, anti-oxidants, pigments, dyes, viscosity modifiers, coalescing agents, and additional monomers present to alter various properties of the resulting polymer matrix. The first coating composition is disposed nearest the substrate forming a first layer. The second coating composition is disposed such that a second layer is formed over the first layer. The two layers can be coated simultaneously or sequentially using any suitable coating technique such as, for example, spray coating, rod coating, slide coating, curtain coating, extrusion coating, and combinations thereof.

The binder used in the first coating composition can be the same or different than the binder in the second coating composition. Either one or both binders can be a cholesteric liquid crystal composition. If the binders are both cholesteric liquid crystal compositions, the pitches can be the same or different.

In some embodiments, the binder may substantially isolate cholesteric liquid crystal particles from each other and from the surface of the substrate. If the binder is not a cholesteric liquid crystal material, the orientation of the helical axes of the cholesteric liquid crystal particles can be influenced by, for example, the manufacturing process, particle shape, etc. or the orientation can be random. For example, the manufacturing process and particle shape can influence the orientation of the cholesteric liquid crystal's helical axis when the binder is a film that has been stretched. Such elongation will present the cholesteric liquid crystal particles with a local internal stretched polymer interface, which can provide alignment. Additionally or alternatively, the elastic energy of the system may be minimized for an elongated particle shape if the orientation of the cholesteric helix has a particular relationship to the film elongation direction. If there is no preferred alignment direction of the cholesteric liquid crystal director, the optical body can still act as a circular polarizer. Collimated light passing through a randomized particle cholesteric liquid crystal polarizer will exit with a distribution of exit propagation vectors and polarization ellipticities. Such a polarizer will typically have substantially uniform angular performance, although its on-axis transmission may suffer.

In another embodiment, two separate coating compositions are prepared but at least one of the coating composition contains particles of a first cholesteric liquid crystal material in addition to particles having a second cholesteric liquid crystal material. The other coating composition contains particles of a third cholesteric liquid crystal material. Each coating composition contains particles and a binder. The binder can contain either a polymer or lower weight compounds that can be reacted to form a polymer. If the binder contains lower molecular weight compounds, crosslinking agents and polymerization initiators can be present. The binder can be a cholesteric liquid crystal composition. The coating composition can also contain various other compounds such as, for example, surface-active agents, anti-oxidants, pigments, dyes, viscosity modifiers, coalescing agents, and other monomers present to alter the properties of the resulting polymeric matrix. The first coating composition is disposed nearest the substrate forming a first layer. The second coating composition is disposed over the first layer such that a structure is formed like that shown schematically in FIG. 2C. The two layers can be coated simultaneously or sequentially using any known coating technique such as, for example, spray coating, rod coating, slide coating, curtain coating, extrusion coating, and combinations thereof.

The average size of the particles in the first layer can be the same or different. The particles can optionally be segregated within a layer by varying the size of the particles. By choosing a slow drying solvent, the particles with a specific gravity greater than or comparable to that of the other particles can settle faster. The heavier particles can be more concentrated near the substrate surface.

Figure 4:
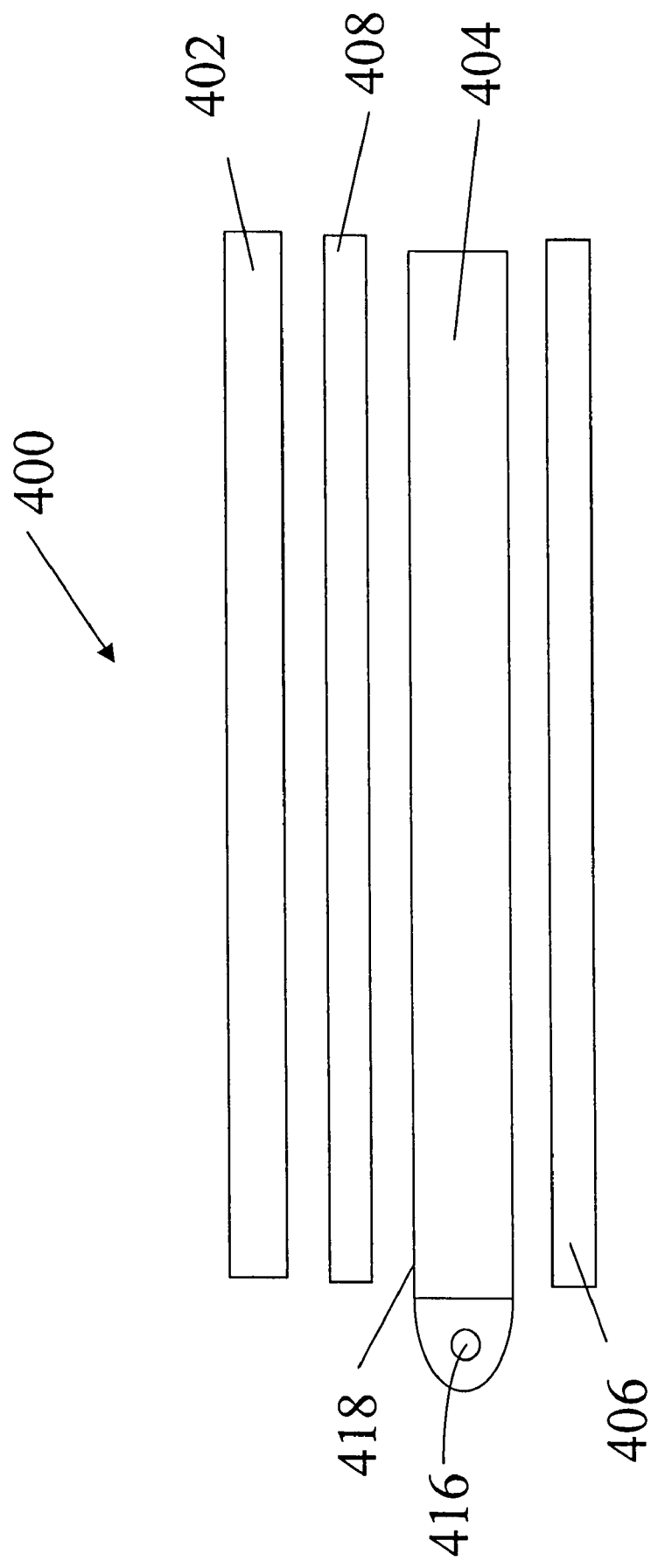
FIG. 4 is a schematic illustration of one embodiment of a liquid crystal display, according to the invention.

The cholesteric liquid crystal optical bodies can be used in a variety of optical displays and other applications, including transmissive (e.g., backlit), reflective, and transflective displays. For example, FIG. 4 illustrates a schematic cross-sectional view of one illustrative backlit display system 400 including a display medium 402, a backlight 404, a cholesteric liquid crystal reflective polarizer 408, as described above, and an optional reflector 406. The display system optionally includes a quarter wave plate as part of the cholesteric liquid crystal reflective polarizer or as a separate component to convert the circularly polarized light from the liquid crystal reflective polarizer to linearly polarized light. A viewer is located on the side of the display device 402 that is opposite from the backlight 404.

The display medium 402 displays information or images to the viewer by transmitting light that is emitted from the backlight 404. One example of a display medium 402 is a liquid crystal display (LCD).

The backlight 404 that supplies the light used to view the display system 400 includes, for example, a light source 416 and a light guide 418, although other backlighting systems can be used. Although the light guide 418 depicted in FIG.

4 has a generally rectangular cross-section, backlights can use light guides with any suitable shape. For example, the light guide 418 can be wedge-shaped, channeled, a pseudo-wedge guide, etc. The primary consideration is that the light guide 418 be capable of receiving light from the light source 416 and emitting that light. As a result, the light 418 can include back reflectors (e.g., optional reflector 406), extraction mechanisms and other components to achieve the desired functions.

The reflective polarizer 408 is an optical body (e.g., an optical film) that includes at least one cholesteric liquid crystal optical body, as described above. The reflective polarizer 408 is provided to substantially transmit light of one polarization state exiting the light guide 418 and substantially reflect light of a different polarization state exiting the light guide 418.

Figure 5:
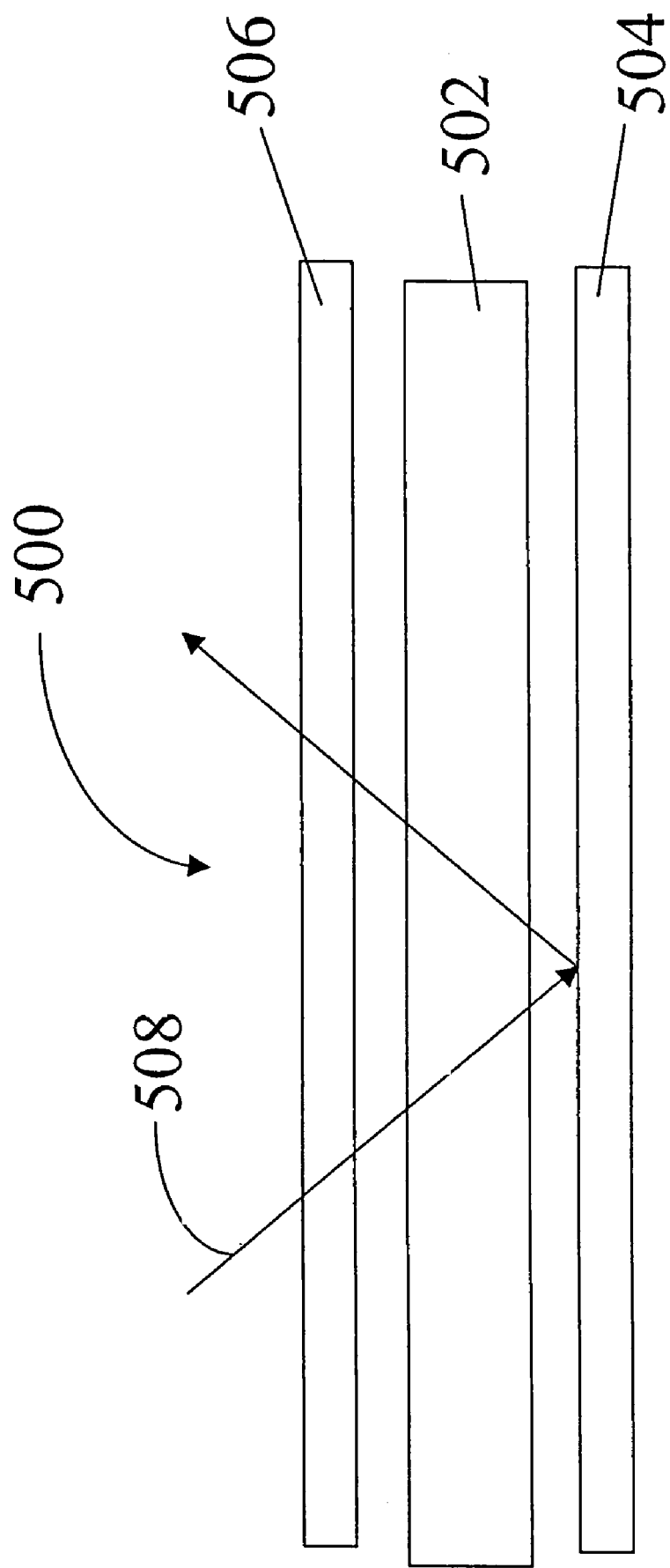
FIG. 5 is a schematic illustration of another embodiment of a liquid crystal display, according to the invention.

FIG. 5 is a schematic illustration of one type of reflective liquid crystal display 500. This reflective liquid crystal display 500 includes a display medium 502, a mirror 504, and a reflective polarizer 506. The display system optionally includes a quarter wave plate as part of the cholesteric liquid crystal reflective polarizer or as a separate component to convert the circularly polarized light from the liquid crystal reflective polarizer to linearly polarized light. Light 508 is polarized by the reflective polarizer 506, travels through the display medium 502, bounces off the mirror 504, and goes back through the display medium 502 and reflective polarizer 506. The reflective polarizer 506 of this reflective liquid crystal display 500 includes one cholesteric liquid crystal optical body, as described above. The specific choice of cholesteric liquid crystal optical body can depend on factors such as, for example, cost, size, thickness, materials, and wavelength range of interest.

The cholesteric liquid crystal optical body can be used with a variety of other components and films that enhance or provide other properties to a liquid crystal display. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, multilayer dielectric back reflectors, and holographic back reflectors.

EXAMPLES

Circular polarization characteristics of the polarizers produced in the following examples were measured by measuring the transmittance of light through a combination of the test sample, which produced light having a circularly polarized component; a quarter wave plate, which converted the circularly polarized light to linearly polarized light; and a linear polarizer, hereinafter called the analyzer, which, depending on orientation, either passed or blocked the linearly polarized light produced by the quarter wave plate. These components were placed in series in the light path of a Perkin Elmer Lambda 900 spectrophotometer, with the light first entering the test sample and finally leaving the analyzer. The sample to be tested was placed in the light path of the spectrophotometer with the substrate facing the light source to avoid any substrate birefringence effects that might affect the light after polarization. Transmission was measured over the visible light spectrum with the analyzer first oriented with its transmission axis at 45° to an optical axis of the quarter wave plate in a direction which produced maximum transmission, hereinafter referred to as the pass transmission, and then with the analyzer oriented at 45° in the opposite direction, that is to say at 90° from the original orientation, to produce minimum transmission, hereinafter referred to as the block transmission. The degree of light blockage, that is to say the difference between the block and pass curves, was an indication of the degree of polarization, since light which is perfectly linearly polarized as it emerges from the quarter wave plate would, in principle, be completely blocked by the analyzer, while unpolarized light would be unaffected by any differences in orientation of the analyzer. The level of blockage is therefore an indication of the polarization effect produced by the test sample.

The substrate for each example was a transparent film having a thickness of about 125 micrometers (0.005 inches) to which an oriented alignment layer of polyvinyl alcohol (PVA) with thickness of 50 µm or less was fixedly attached. The substrate was produced by continuous web extrusion of a copolyester formed by copolymerization of naphthalene dicarboxylate, dimethylene terephthalate, and suitable diols in a conventional manner, followed by coating of the film with an aqueous dispersion of Airvol 425 PVA, available from Air Products and Chemicals, Allentown, Pa. The PVA alignment layer was then dried and then the PVA coated film was heated and stretched to about 6.8 times its original dimension, in the crossweb direction using a conventional oven and continuous web tentering apparatus to produce surface orientation in the PVA alignment layer. Examples of such substrates are described in U.S. Pat. Nos. 6,096,375; 6,113,811; and 6,111,697, all of which are incorporate herein by reference. It will be recognized that other transparent substrates can also be used.

As indicated in some of the following examples, the coated layers were UV cured. This procedure was performed using a 118 watt per cm (300 watt per inch) Fusion brand conveyer type curing apparatus (Model No. MC-6RQN, Fusion UV Systems, Inc., Gaithersburg, Md.) which was equipped to perform UV curing under a nitrogen atmosphere. The conveyer speed was about 6.1 meters/min (20 ft/min), and two passes were made for each cure, resulting in an estimated total exposure of about 2 $J/cm^2$.

Comparative examples A-D and Examples 1-2 below utilized methyl ethyl ketone (MEK) solutions of liquid crystal chiral monomer Paliocolor™ LC-756 and achiral monomer Paliocolor™ LC-242, both available from BASF Corporation of Ludwigshafen, Germany. By combining varying amounts of LC-756 and LC-242, along with photoinitiator α-hydroxy-α,α-dimethylacetophenone, available as Darocur™ 1173 from Ciba Geigy Corp. of Basel, Switzerland, in MEK, solutions were formed which could be coated onto substrates, dried, aligned into mesophases by heating, and UV cured to form reflective polarizers having different polarization characteristics. Three solutions were prepared, as shown in Table I:

TABLE I

| DESIGNATION | LC-756:LC-242 | DAROCUR™ 1173 | % SOLIDS |
|---|---|---|---|
| 1:20 Solution | 1:20 | 3 wt. % of solids | 20.5%–20.7% |
| 1:24 Solution | 1:24 | 3 wt. % of solids | 20.5%–20.7% |
| 1:28 Solution | 1:28 | 3 wt. % of solids | 20.5%–20.7% |

In Table I, the term solids includes LC-756, LC-242, and Darocur™ 1173. The ratios of LC-756:LC-242 are by weight.

Comparative Example A

Figure 6:
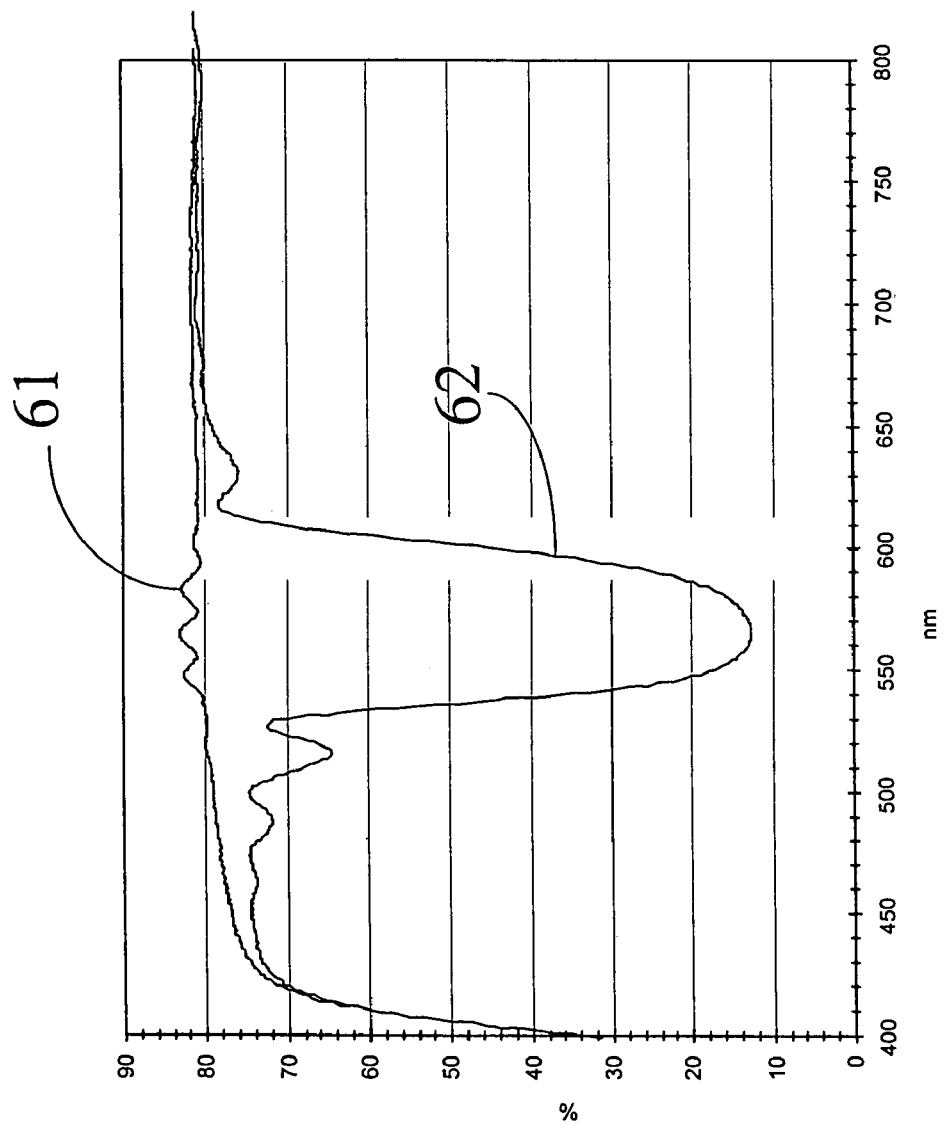
FIG. 6 is the transmission spectrum for a structure prepared by coating a composition containing a single cholesteric liquid material that reflects in the green region of the visible spectrum.

A coating of the 1:24 solution of Table I was applied to the PVA alignment layer described above by means of a #14 wirewound coating rod, commonly referred to as a Mayer rod. The #14 Mayer rod produced a liquid coating having a thickness of 35.6 micrometers. The coated liquid layer was then dried at 66° C. for 5 minutes, followed by UV cure as described above, under a nitrogen atmosphere. Optical polarization characteristics were measured in the manner described above, and the transmission curves are illustrated in FIG. 6 as percent transmission vs. wavelength. In FIG. 6, curve 61 is the block transmission, and curve 62 is the pass transmission. It is seen from the differences between curves 61 and 62 that a strong polarization effect occurs for wavelengths in the range of 550 to 580 nanometers (nm), meaning that less light of one polarization in the green region of the visible spectrum is transmitted. Outside of this range, the differences between transmission for curves 61 and 62 are less pronounced, indicating a substantially smaller polarization effect at these wavelengths.

Comparative Examples B-D

Figure 7:
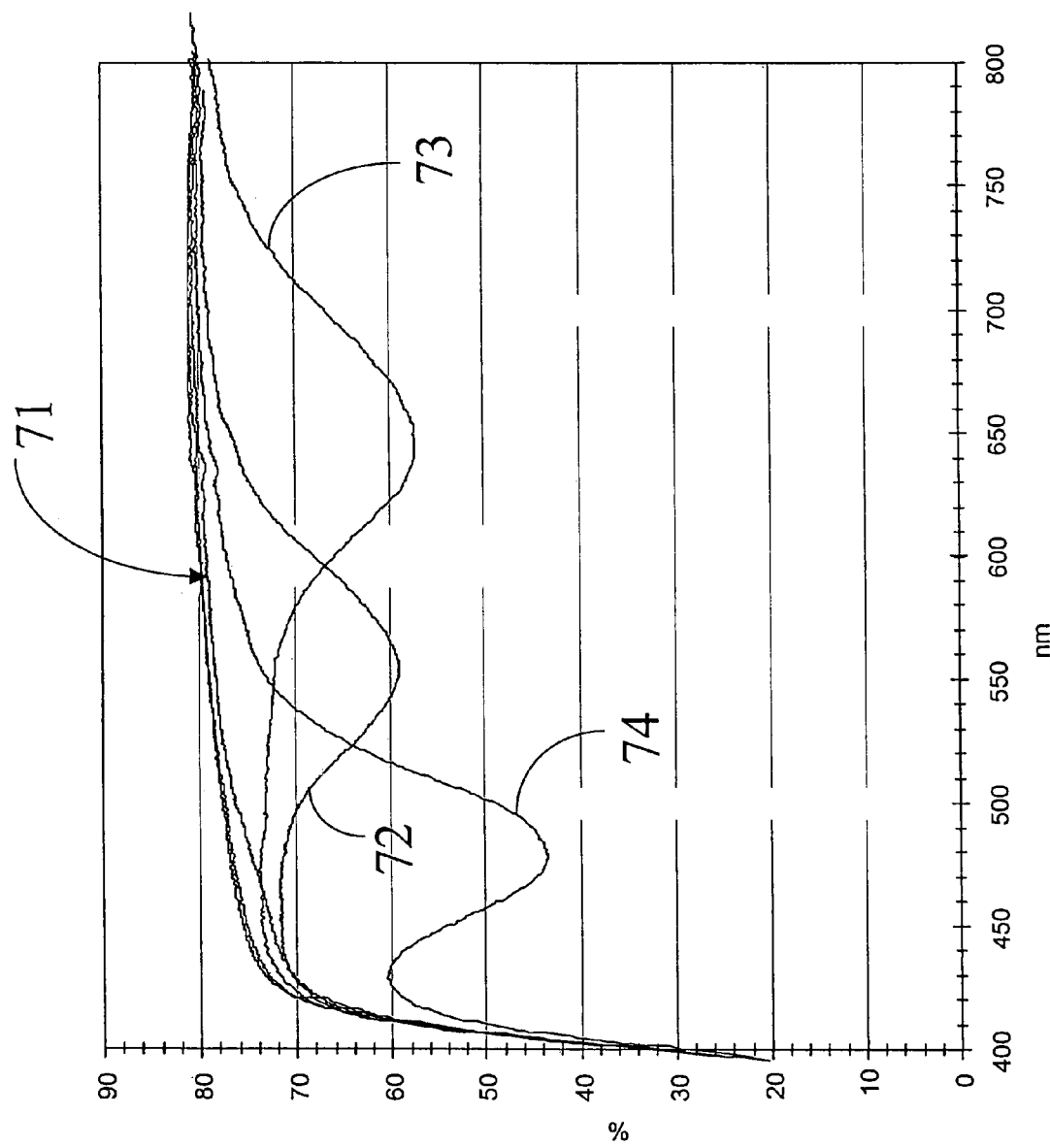
FIG. 7 is the transmission spectra for three structures containing a single cholesteric liquid crystal polymer disposed on a substrate as an aerosol, where the three structures reflect in the red, green, and blue regions of the visible spectrum, respectively.

Individual coatings of the three solutions from Table I was applied to separate PVA alignment layers (described above) using a Preval brand handheld aerosol sprayer which was held at a distance of about 12-18 inches from the substrate during spraying. While coverage of the sprayed surface varied depending upon spraying distance and duration of spraying, the spraying generally provided complete coverage of the surface. After spraying, the liquid layer was dried at 66° C. for 5 minutes, followed by UV cure, as described above, under nitrogen atmosphere. Optical polarization characteristics were measured as described above. Referring to FIG. 7 which illustrates percent transmission vs. wavelength, transmission curves 72, 73, 74 for the block orientation of the analyzer was obtained, while the pass curves fell in the general area of the family of curves 71. As seen from curves 72, 73, 74, while a significant polarization effect is present, it is limited to reflecting light in the part of the visible spectrum perceived by the eye as green (1:24 solution of Table I), red (1:28 solution), or blue (1:20 solution), respectively, thereby producing a reduction in transmission in the green, red, or blue region of the visible spectrum.

Example 1

Figure 8:
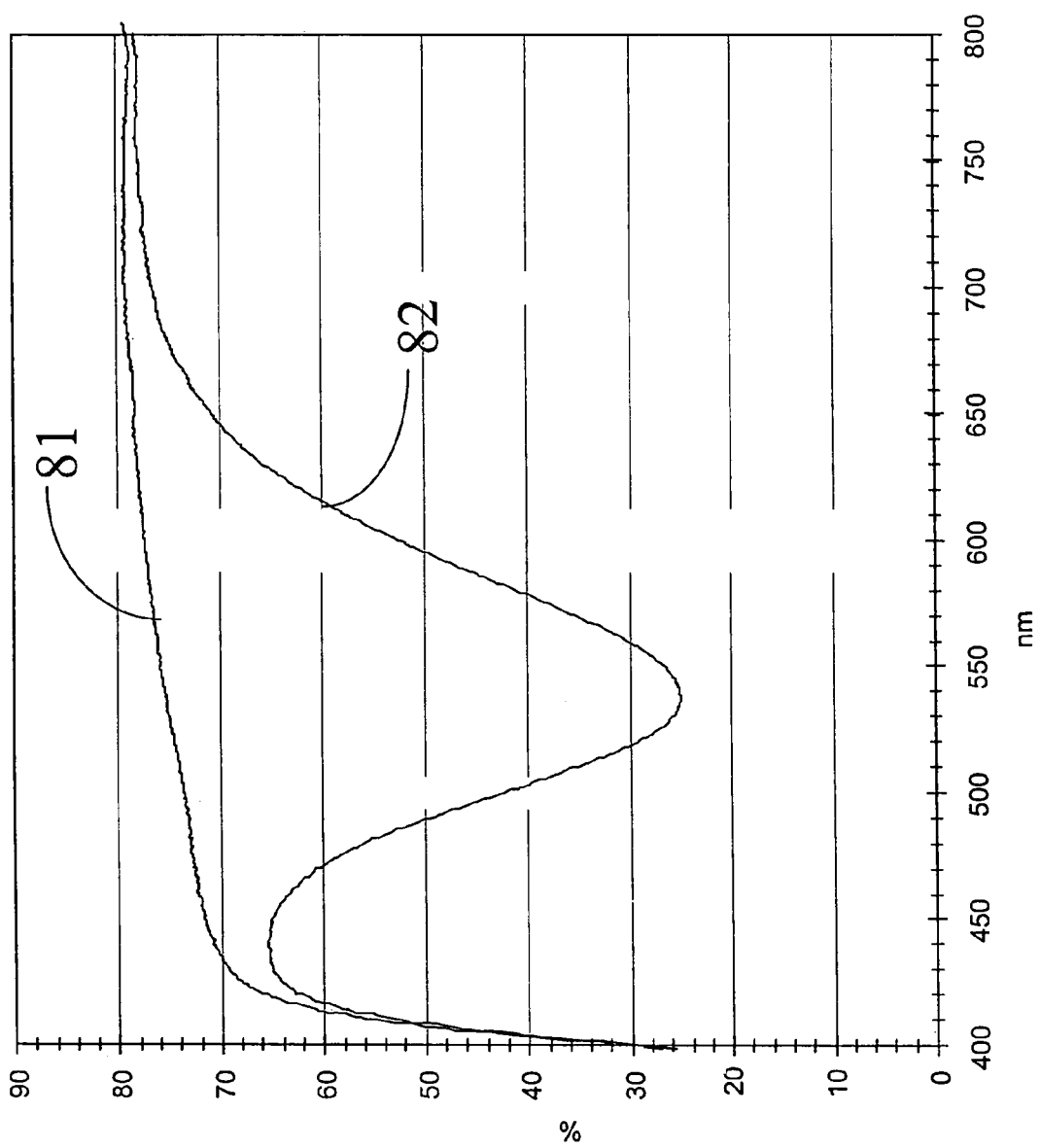
FIG. 8 is the transmission spectrum for a structure containing three cholesteric liquid crystal compositions individually disposed on a substrate as an aerosol, where each composition was cured after disposition.

A coating of the 1:28 solution from Table I was applied to the substrate described above using a Preval brand handheld aerosol sprayer as described in Comparative Example B. After spraying, the liquid layer was dried at 66° C. for 2 minutes. A coating of the 1:24 solution from Table I was then applied in a similar manner, and dried at 66° C. for 2 minutes. Finally, a coating of the 1:20 solution from Table I was applied by spraying in the same manner as the previous layers, and dried at 66° C. for 2 minutes. After the final drying, the combined layers were UV cured as described above. Optical polarization characteristics were measured as described above, with the results shown in FIG. 8. Curve 82 is the transmission for the analyzer in the block orientation and curve 81 is the transmission for the analyzer in the pass orientation.

Example 2

Figure 9:
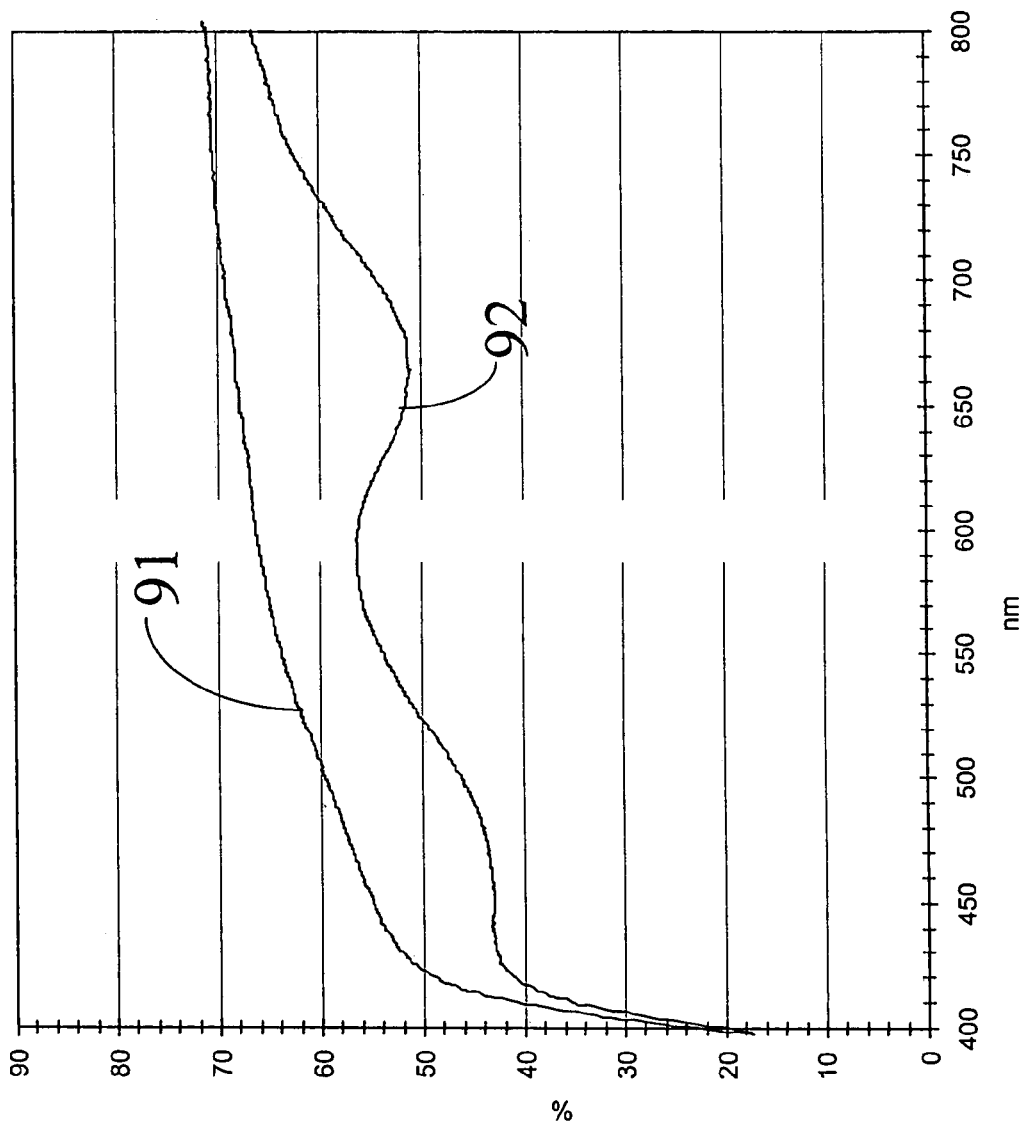
FIG. 9 is the transmission spectrum for a structure containing three cholesteric liquid crystal compositions individually disposed on a substrate as an aerosol in which the compositions were cured after all three had been disposed.

A coating of the 1:28 solution from Table I was applied to the substrate described above using a Preval brand handheld aerosol sprayer as described in Comparative Example B. Without drying this layer, a coating of the 1:24 solution from Table I was applied in a similar manner, followed by a sprayed coating of the 1:20 solution from Table I. The combined layers were then dried at 66° C. for 2 minutes and UV cured as described above. Optical polarization characteristics were measured as described above, with the results shown in FIG. 9. Curve 92 is the transmission for the analyzer in the block orientation and curve 91 is the transmission for the analyzer in the pass orientation. It will be noted that curve 92 of FIG. 9 differs significantly from curve 82 of FIG. 8, thereby indicating that the drying sequence for the coatings can have a significant effect on the optical polarization characteristics of the coatings.

Example 3

Figure 10:
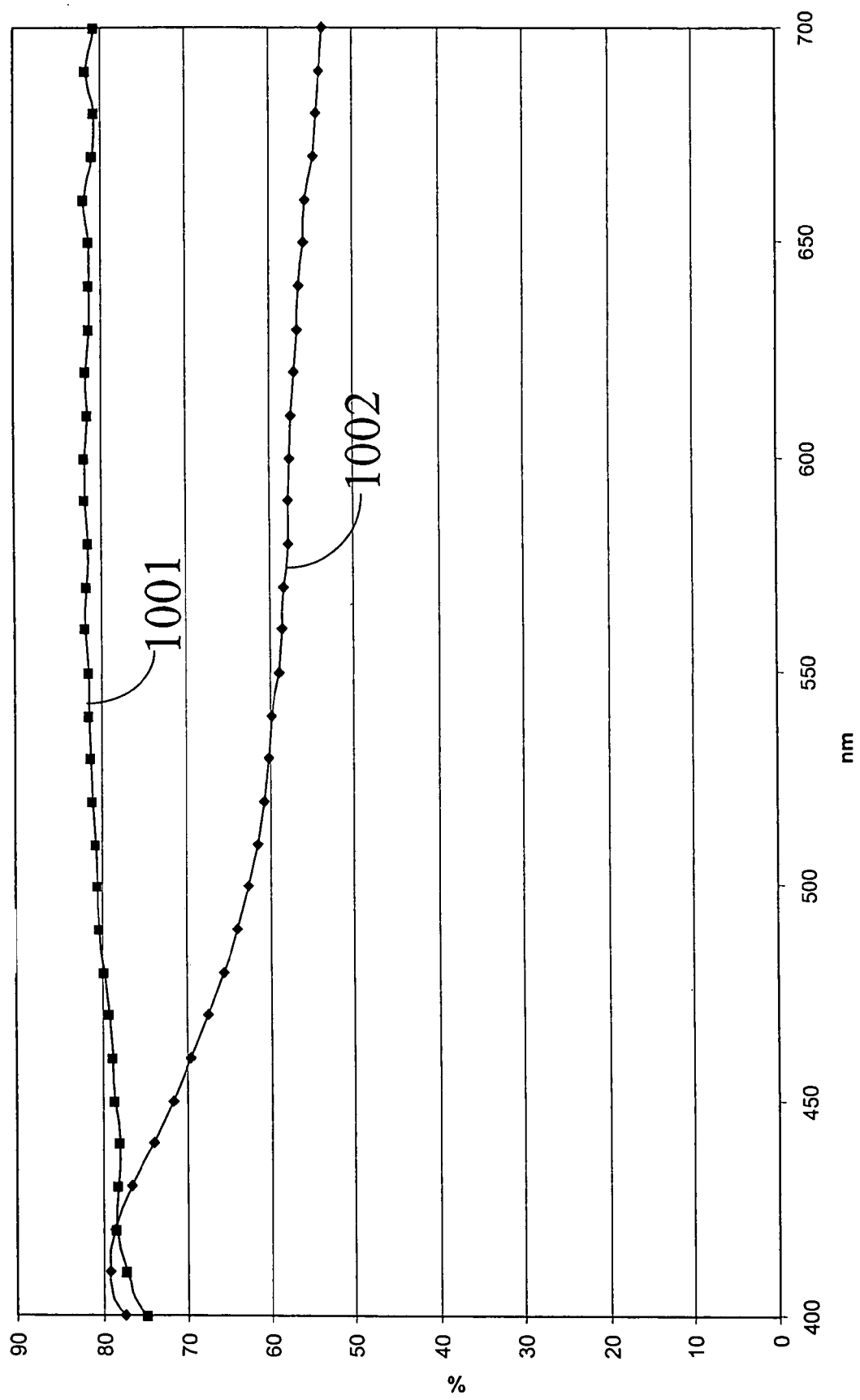
FIG. 10 is the transmission spectrum for a structure containing two cholesteric liquid crystal compositions individually disposed on a substrate as an aerosol.

A first solution, solution 1, was formed by dissolving 2.8 parts by weight of LC-756, 17.2 parts by weight of LC-242, and 0.2 parts by weight of thermally activated initiator 2,2'-azobis(2,4-dimethylvaleronitrile), available as VAZO 52 from Du Pont Company, Wilmington, Del., in 79.8 parts by weight of tetrahydrofuran (THF). A second solution, solution 2, having a different ratio of LC-756 to LC-242, was formed by dissolving 4.8 parts by weight of LC-756, 15.2 parts by weight of LC-242, and 0.2 parts by weight of VAZO 52 in 79.8 parts by weight of THF. Each of these solutions were polymerized at 60° C. for 14 hours, and then diluted with THF to produce solutions having a solids content of 10% each. Solution 1 was sprayed, using a Preval brand hand aerosol sprayer held at a distance of about 18", onto a PVA alignment layer of the type described above and allowed to air dry at room temperature. Solution 2 was then sprayed over the dried layer of solution 1 and allowed to air dry at room temperature. The combined layers were then heated to 115° C. for 10 minutes and allowed to cool. Optical polarization characteristics were tested in the manner described above, with the results shown in FIG. 10. Curve 101 portrays the transmission with the analyzer in the pass orientation and curve 102 portrays the transmission with the analyzer in the block orientation. It is seen from the differences between the curves that polarization effects occur over a relatively large portion of the visible spectrum.

Example 4

A coatable emulsion was prepared by dissolving 0.09 grams of LC-756 and 0.91 grams of LC-242 in 10.0 grams of tetrahydrofuran (THF). To this solution was then added 0.05 grams of methoxypolyethoxy(12)methacrylate, available as MPEM-12 from Bimax Inc., Cockeysville, Md. An initiator, tert-butyl peroxy-2-ethylhexanoate in a 50% solution with odorless mineral spirits, available as Trigonox™ 21-C50 from Akzo Nobel Chemicals Inc., Chicago, Ill., was then added, in the amount of 0.2 grams, to the solution. Polymerization was carried out at 70° C. for 8 hours. A portion of the THF was then evaporated to bring the weight of the solution down to about 5 grams. Water, in the amount of 10.0 grams, was then added to the solution, with stirring. This produced a moderately stable emulsion, which was then coated onto the PVA alignment layer described above, using a #14 wirewound Mayer rod. The coating was heated to 120° C. for a time sufficient to align the layer, and the optical polarization characteristics were tested as described above. Examples 4-10 illustrate the use of a plasticizing monomer in forming cholesteric liquid crystal polymers.

Example 5

A coatable emulsion was prepared by dissolving 0.09 grams of LC-756 and 0.91 grams of LC-242 in 10.0 grams of tetrahydrofuran (THF). To this solution was then added up to 20 wt % (e.g., 5 wt. %, 10 wt. %, and 20 wt. %) of poly(ethylene glycol)(100)monoacrylate, available from Polysciences, Inc., Warrington, Pa. Trigonox™ 21-C50 was then added, in the amount of 0.2 grams, to the solution. Polymerization was carried out at 70° C. for 8 hours. A portion of the THF was then evaporated, to bring the weight of the solution down to about 5 grams. Water, in the amount of 10.0 grams, was then added to the solution, with stirring. This produced a moderately stable emulsion, which was coated onto the PVA alignment layer described above using a #14 wirewound Mayer rod. The coating was heated to 120° C. for 10 minutes to align the layer, and the optical polarization characteristics were tested as described above.

Example 6

A coatable emulsion was prepared by dissolving 0.05 grams of LC-756 and 0.95 grams of LC-242 in 10.0 grams of tetrahydrofuran (THF). To this solution was added 0.05 grams of methoxypolyethoxy(12)methacrylate. Trigonox™ 21-C50 was then added, in the amount of 0.2 grams, to the solution. Polymerization was then carried out at 70° C. for 8 hours. A portion of the THF was then evaporated, to bring the weight of the solution down to about 5 grams. Water, in the amount of 10.0 grams, was then added to the solution, with stirring. This produced a moderately stable emulsion, which was then coated onto the PVA layer described above, using a #14 wirewound Mayer rod. The coating was heated to 120° C. for a time sufficient to align the layer, and the optical polarization characteristics were tested as described above.

Example 7

A coatable emulsion was prepared by dissolving 0.05 grams of LC-756 and 0.95 grams of LC-242 in 10.0 grams of tetrahydrofuran (THF). To this solution was then added 0.05 grams of polyethylene glycol monoacrylate. Trigonox™ 21-C50 was then added, in the amount of 0.2 grams, to the solution. Polymerization was then carried out at 70° C. for 8 hours. A portion of the THF was then evaporated, to bring the weight of the solution down to about 5 grams. Water, in the amount of 10.0 grams, was then added to the solution with stirring. This produced a moderately stable emulsion, which was then coated onto the PVA layer described hereinabove, using a #14 wirewound Mayer rod. The coating was heated to 120° C. for a time sufficient to align the layer, and the optical polarization characteristics were tested as described above.

Example 8

A coatable emulsion was prepared by dissolving 0.09 grams of LC-756 and 0.91 grams of LC-242 in 10.0 grams of tetrahydrofuran (THF). To this solution was then added 0.2 grams of polyethylene glycol(1000)monomethylether monomethacrylate, available from Polysciences Inc., Warrington, Pa. An initiator, VAZO 52, was added in the amount of 0.2 grams to the solution. Polymerization was then carried out at 60° C. for 8 hours. A portion of the THF was then evaporated, to bring the weight of the solution down to about 5 grams. Water, in the amount of 10.0 grams, was then added to the solution with stirring. This produced a moderately stable emulsion, which was then coated onto the PVA layer described above, using a #14 wirewound Mayer rod. The coating was heated to 120° C. for a time sufficient to align the layer, and the optical polarization characteristics were tested as described above.

Example 9

A coatable emulsion was prepared in a manner similar to that of Example 8 by first dissolving 0.09 grams of LC-756 and 0.91 grams of LC-242 in 10.0 grams of tetrahydrofuran (THF). To this solution was then added 0.4 grams, rather than the 0.2 grams used in Example 8, of polyethylene glycol(1000)monomethylether monomethacrylate. An initiator, VAZO 52, was then added, in the amount of 0.2 grams, to the solution. Polymerization was then carried out at 60° C. for 8 hours. A portion of the THF was then evaporated, to bring the weight of the solution down to about 5 grams. Water, in the amount of 10.0 grams, was then added to the solution with stirring. This produced a moderately stable emulsion, which was then coated onto the PVA layer described hereinabove, using a #14 wirewound Mayer rod. The coating was heated to 120° C. for a time sufficient to align the layer, and the optical polarization characteristics were tested as described above.

Example 10

A coatable emulsion was prepared by dissolving 0.9 grams of LC-756 and 9.1 grams of LC-242 in 90 grams of tetrahydrofuran (THF). The solution was flushed with nitrogen to expel oxygen. To this solution was added 1 g of Trigonox™ 21C-50 and the solution was heated to about 60° C. until the solids completely dissolved, forming a stock monomer solution.

Three vials were prepared containing 15 g of the stock monomer solution. An amount of 2 wt. % solution of 3-methacryloxypropyl trimethoxysilane, available form United Chemical Technologies, Bristol, Pa., in THF was added to each vial. The first vial received 2 g, the second vial received 4 g, and the third vial received 6 g. Polymerization was then carried out at about 65° C. for 8 hours. After polymerization, water in the amount of 15 grams was then added to the solution with stirring. A emulsion with about 5 wt. % solids was taken and dip coated onto a glass microscope slide and then dried.

Example 11

A coatable emulsion was prepared by dissolving 18.2 grams of Compound A

Compound A

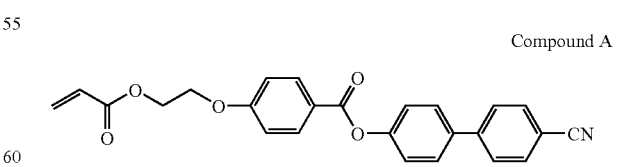

and 1.8 grams of LC-756 in 80 grams of tetrahydrofuran (THF) and heated to about 60° C. to obtain a clear solution. Compound A can be prepared as described in European Patent Application Publication No. 834754, incorporated herein by reference. The solution was flushed with nitrogen to expel oxygen. The solution was cooled and then 2 g of Trigonox™ 21C-50 was added to form a stock monomer solution.

A vial was prepared containing 20 g of the stock monomer solution. An amount of 0.5 g of a 10% solution of methoxypolyethoxy-12 methacrylate (Bimax Chemicals LTD., Cockeysville, Md.) in THF was added to the vial. Carbon tetrabromide (3 g of a 5% solution in THF) was also added and mixed in the vial. Polymerization was then carried out at about 60° C. for at least 18 hours. After polymerization, poly(ethylene oxide)$_{35}$ lauryl ether (available as Brij 35 from Aldrich Chemical Co., Milwaukee, Wis.) and a 1:1 mixture of ethyl acetate:THF was added to provided an emulsion that contained 17 wt. % solids and 2.7 wt. % poly(ethylene oxide)$_{35}$ lauryl ether. The emulsion was taken and dip coated onto a glass microscope slide and then dried.

Example 12

A coatable emulsion was prepared by dissolving 18.2 grams of Compound A, described in Example 11, and 1.8 grams of LC-756 in 80 grams of tetrahydrofuran (THF) and heated to about 60° C. to obtain a clear solution. The solution was flushed with nitrogen to expel oxygen. The solution was cooled and then 2 g of Trigonox™ 21C-50 was added to form a stock monomer solution.

A vial was prepared containing 20 g of the stock monomer solution. An amount of 0.5 g of a 10% solution of lauryl methacrylate (Aldrich Chemical Co., Milwaukee, Wis.) in THF was added to the vial. Carbon tetrabromide (3 g of a 5% solution in THF) was also added and mixed in the vial. Polymerization was then carried out at about 60° C. for at least 18 hours. After polymerization, poly(ethylene oxide)$_{35}$ lauryl ether and a 1:1 mixture of ethyl acetate:isopropanol was added to provided an emulsion that contained 13 wt. % solids and 10 wt. % poly(ethylene oxide)$_{35}$ lauryl ether. The emulsion was taken and dip coated onto a glass microscope slide and then dried.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A method of making an optical body, the method comprising:
    (a) disposing on a substrate a plurality of first particles comprising a first cholesteric liquid crystal composition;
    (b) disposing on the substrate a second cholesteric liquid crystal composition to form a structure with the first cholesteric liquid crystal composition; and
    (c) converting the first and second cholesteric liquid crystal compositions into first and second cholesteric liquid crystal materials, respectively, wherein the first cholesteric liquid crystal material has a pitch different than the second liquid crystal material;
    wherein at least one of the first and second cholesteric liquid crystal compositions comprise chiral monomers, non-chiral monomers, and surfactant comonomers.

2. The method of claim 1, wherein disposing the plurality of first particles comprises disposing the plurality of first particles using a coating technique selected from spray coating, rod coating, slide coating, curtain coating, extrusion coating, and combinations thereof.

3. The method of claim 1, wherein disposing on the substrate a second cholesteric liquid crystal composition comprises disposing the second cholesteric composition using a coating technique selected from spray coating, rod coating, slide coating, curtain coating, extrusion coating, and combinations thereof.

4. The method of claim 1, wherein disposing on the substrate the second cholesteric liquid crystal composition occurs simultaneously with disposing on the substrate the first particles of the first cholesteric liquid crystal composition.

5. The method of claim 1, wherein disposing the plurality of first particles and disposing the second cholesteric liquid crystal composition comprises disposing on the substrate the first particles of the first cholesteric liquid crystal composition in a matrix comprising the second cholesteric liquid crystal composition.

6. The method of claim 1, wherein disposing the second cholesteric liquid crystal composition comprises disposing on the substrate a plurality of second particles comprising the second cholesteric liquid crystal composition.

7. The method of claim 1, further comprising disposing a third cholesteric liquid crystal composition to form a structure with the first and second cholesteric liquid crystal compositions, wherein the third cholesteric liquid crystal composition is converted into a third liquid crystal material having a pitch different than the pitch of the first and second cholesteric liquid crystal materials.

8. The method of claim 1, wherein the structure has more than one layer.

9. The method of claim 1, further comprising heating the first and second cholesteric liquid crystal compositions to produce diffusion between the first and second cholesteric liquid crystal compositions.

10. The method of claim 1, further comprising heating the first and second cholesteric liquid crystal materials to produce diffusion between the first and second cholesteric liquid crystal materials.

11. The method of claim 1, wherein the disposing steps comprise disposing a mixture on the substrate, the mixture comprising the plurality of first particles comprising a first cholesteric liquid crystal composition dispersed in a matrix of the second cholesteric liquid crystal composition, to form a structure with the first cholesteric liquid crystal composition.

* * * * *

UNITED STATES PATENT AND TRADEMARK OFFICE
CERTIFICATE OF CORRECTION

PATENT NO. : 7,298,442 B2
APPLICATION NO. : 11/066340
DATED : November 20, 2007
INVENTOR(S) : Christopher C. Bowley It is certified that error appears in the above-identified patent and that said Letters Patent is hereby corrected as shown below:

Page 2, Column 2,
Under "Foreign Patent Documents," Line 30, delete "WO 95/17892" and insert -- WO 95/17692 --, therefor.
Under "Other Publications," Line 1, delete "Opitcs" and insert -- Optics --, therefor.

Column 2,
Line 48, delete "With" and insert -- with --, therefor.

Column 10,
Line 55, delete "photoaligmnent," and insert -- photoalignment, --, therefor.

Column 12,
Line 25, delete "12methacrylate" and insert -- 12 methacrylate --, therefor.

Column 18,
Line 58, delete "DAROCUR ™" and insert -- DAROCUR™ --, therefor.

Column 22,
Line 34, delete "Trigonox™ 21C-50" and insert -- Trigonox™21-C50 --, therefor.

UNITED STATES PATENT AND TRADEMARK OFFICE
CERTIFICATE OF CORRECTION

PATENT NO. : 7,298,442 B2  
APPLICATION NO. : 11/066340  
DATED : November 20, 2007  
INVENTOR(S) : Christopher C. Bowley It is certified that error appears in the above-identified patent and that said Letters Patent is hereby corrected as shown below:

Column 23,  
Line 2, delete "Trigonox™ 21C-50" and insert -- Trigonox™21-C50 --, therefor.  
Line 25, delete "Trigonox™ 21C-50" and insert -- Trigonox™21-C50 --, therefor.

Signed and Sealed this

Twenty-seventh Day of May, 2008

JON W. DUDAS  
*Director of the United States Patent and Trademark Office*